Aug. 3, 1965  J. C. CHRISTENSON ETAL  3,198,541
UNIVERSAL STEERING APPARATUS

Filed June 18, 1962  10 Sheets-Sheet 1

INVENTORS.
RONALD A. BRUDI and
JOHN C. CHRISTENSON
BY
ATTORNEYS

INVENTORS
RONALD A. BRUDI and
JOHN C. CHRISTENSON
ATTORNEYS

Aug. 3, 1965   J. C. CHRISTENSON ETAL   3,198,541
UNIVERSAL STEERING APPARATUS

Filed June 18, 1962   10 Sheets-Sheet 3

INVENTORS
RONALD A. BRUDI and
JOHN C. CHRISTENSON
BY
ATTORNEYS

Aug. 3, 1965   J. C. CHRISTENSON ETAL   3,198,541
UNIVERSAL STEERING APPARATUS
Filed June 18, 1962   10 Sheets-Sheet 4

INVENTORS
RONALD A. BRUDI and
JOHN C. CHRISTENSON
BY
ATTORNEYS

Aug. 3, 1965    J. C. CHRISTENSON ETAL    3,198,541
UNIVERSAL STEERING APPARATUS
Filed June 18, 1962    10 Sheets-Sheet 5

INVENTORS
RONALD A. BRUDI and
JOHN C. CHRISTENSON
BY
ATTORNEYS

Aug. 3, 1965   J. C. CHRISTENSON ETAL   3,198,541
UNIVERSAL STEERING APPARATUS
Filed June 18, 1962   10 Sheets-Sheet 6

INVENTORS
RONALD A. BRUDI and
JOHN C. CHRISTENSON
BY
ATTORNEYS

Aug. 3, 1965    J. C. CHRISTENSON ETAL    3,198,541
UNIVERSAL STEERING APPARATUS

Filed June 18, 1962    10 Sheets-Sheet 7

INVENTORS
RONALD A. BRUDI and
JOHN C. CHRISTENSON
BY

ATTORNEYS

Aug. 3, 1965    J. C. CHRISTENSON ETAL    3,198,541
UNIVERSAL STEERING APPARATUS

Filed June 18, 1962    10 Sheets-Sheet 9

INVENTORS
RONALD A. BRUDI and
JOHN C. CHRISTENSON
BY
ATTORNEYS

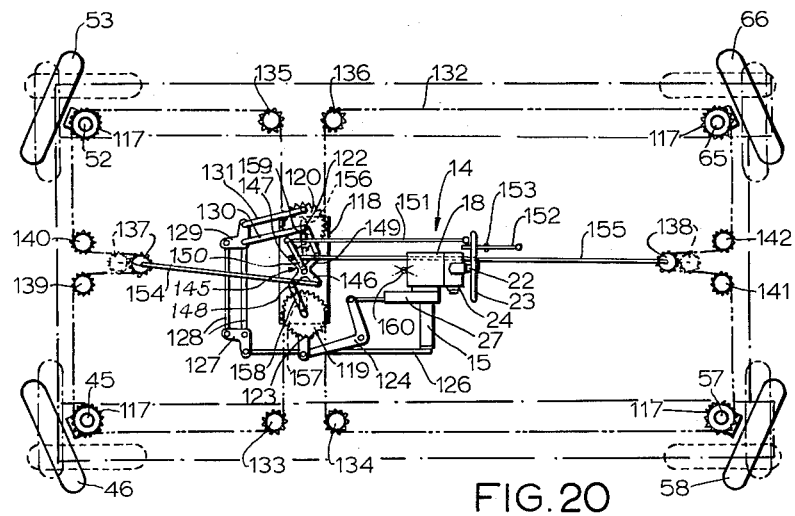
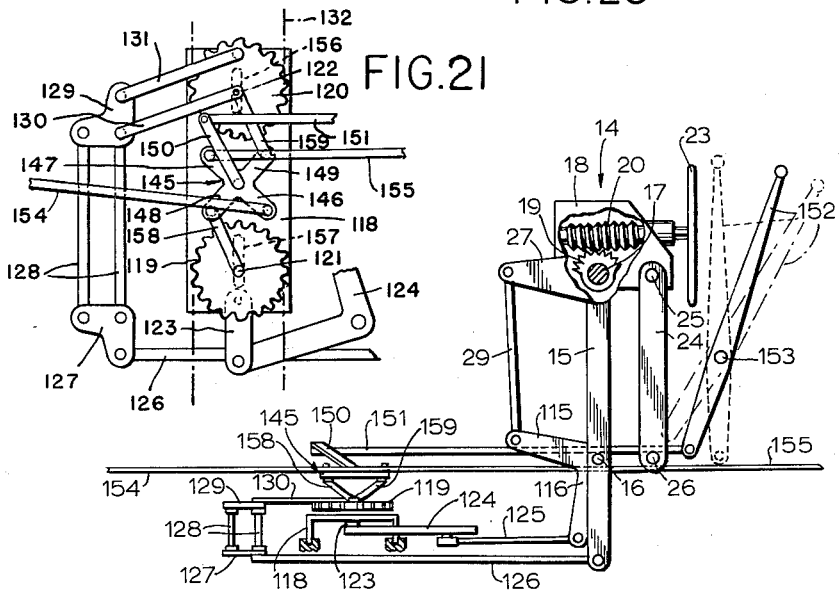

United States Patent Office

3,198,541
Patented Aug. 3, 1965

3,198,541
UNIVERSAL STEERING APPARATUS
John C. Christenson, Battle Creek, Mich., and Ronald A. Brudi, Longview, Wash., assignors to Clark Equipment Company, a corporation of Michigan
Filed June 18, 1962, Ser. No. 203,334
24 Claims. (Cl. 280—91)

This invention relates to steering apparatus and more particularly to a steering apparatus for a wheeled vehicle which provides for turning movement of the vehicle, for straight-line movement of the vehicle along or transverse to its longitudinal axis, and/or for rotation of the vehicle about a vertical axis intermediate the front and rear steering wheels and sides of the vehicle.

It is desirable, in many instances, to provide lift trucks, tractors, and other vehicles operating in a confined space, with optimum flexibility of movement. Normally, the steering apparatus on a lift truck, tractor, or the like, effects control of a pair of steering wheels for turning and straight-line movement of the vehicle along its longitudinal axis, but does not provide for oblique or lateral movement of the vehicle with respect to its longitudinal axis or for rotation of the vehicle about a vertical axis within the borders of the vehicle chassis.

The present invention provides a steering apparatus that may be embodied in a vehicle to allow the operator of the vehicle to turn it left or right or direct it for movement along its longitudinal axis, as in conventional steering, and also obliquely forwardly or rearwardly, laterally left or right, or to rotate the vehicle around a vertical axis within the plan outline of the vehicle.

The invention is especially adaptable to vehicles having at least four ground engaging wheels and in which a pair of front and a pair of rear wheels may be turned independently or simultaneously in the same or different directions to provide any desired direction of movement of the vehicle on the ground.

The selectability of steering movements provided by the invention is obtained through the utilization of a minimum number of operating parts or components providing an economical and practical apparatus for incorporation in wheeled vehicles, either existing or under construction.

One of the primary objects of this invention is to provide a steering apparatus affording optimum flexibility in turning, straight-line, and/or rotary movement of a vehicle on the ground.

Another object is to provide a steering apparatus for a four-wheeled vehicle operable to effect independent front wheel steering, combined front and rear wheel steering, or independent rear wheel steering.

Another object of the invention is to provide a steering apparatus for a vehicle having front and rear steering wheels operable to effect positioning of the steering wheels to direct movement of the vehicle on the ground on its lenthwise axis or along any desired straight line extending transverse to the longitudinal axis of the vehicle.

Another object is to provide steering apparatus for a vehicle having a pair of steering wheels, one at each side of the longitudinal axis of the vehicle, operative, when the vehicle is being turned, to effect splay, or dispose the wheels at different steering angles, so as to track properly in their respective arcs of travel about the steering center to prevent scuffing or skidding of the wheels.

A further object is the provision of steering apparatus for a vehicle having a plurality of pairs of steering wheels, operable to position the wheels so as to permit rotary movement of the vehicle about a vertical axis located within the outline or confines of the vehicle.

A further object is the provision of steering apparatus for a vehicle having more than two pairs of steerable wheels, operable to position the wheels intermediate the front and rear pairs of wheels in correspondence to the positions of the front and rear wheels for a particular direction of movement of the vehicle.

Another object is to provide steering apparatus for a vehicle having a pair of front steering wheels and a pair of rear steering wheels and in which the wheels of each pair are disposed one at each side of the longitudinal axis of the vehicle, operable to position the pair of front wheels and the pair of rear wheels in the same or different directions to achieve movement of the vehicle along the ground in any desired direction.

Still another object is the provision of steering apparatus for a vehicle having a plurality of steerable wheels, operable for selectively positioning the wheels to move the vehicle in selected paths.

The above and other objects and advantages of the invention will become apparent from the following detailed description of certain preferred embodiments of our invention.

Now, in order to acquaint those skilled in the art with the manner of making and using steering apparatus in accordance with the principles of the present invention, we shall describe, in connection with the accompanying drawings, certain preferred embodiments of our invention and the best mode contemplated for carrying out the invention.

In the drawings:

FIGURE 19 is a diagrammatic side elevational view of the steering apparatus of FIGURE 13 including means for positioning the front and rear wheels to effect movement of the vehicle laterally of its longitudinal axis for splay;

FIGURE 20 is a plan view of the steering apparatus of FIGURE 19, showing in full and broken lines several positions in which the front and rear steering wheels of a vehicle may be disposed; and FIGURE 21 is an enlarged plan view of a portion of the apparatus as shown in FIGURE 20, to illustrate the same more clearly.

The steering apparatus of our invention as shown in the several figures of the drawings may be considered to be embodied in a vehicle in which the front and rear ends of the vehicle are to the left and right hand sides of the drawings, respectively, and expressions in the specification with respect to direction of movement and orientation of parts of the steering apparatus and vehicle will be used in the sense noted.

Figure 1:
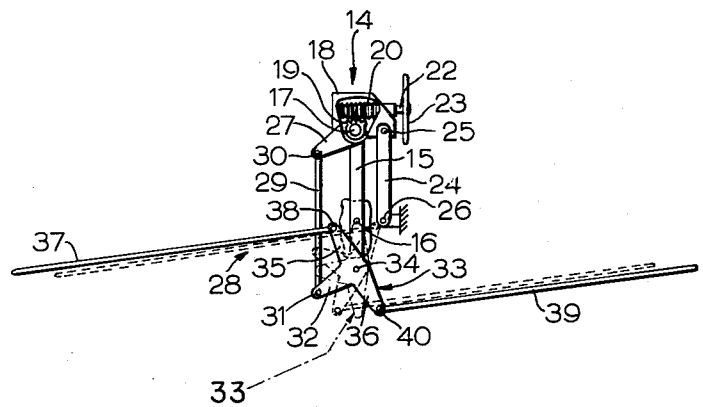
FIGURE 1 is a diagrammatic side elevational view of one embodiment of steering apparatus constructed in accordance with the principles of our invention for use in a vehicle having a pair of front steering wheels and a pair of rear steering wheels.
Figure 9:
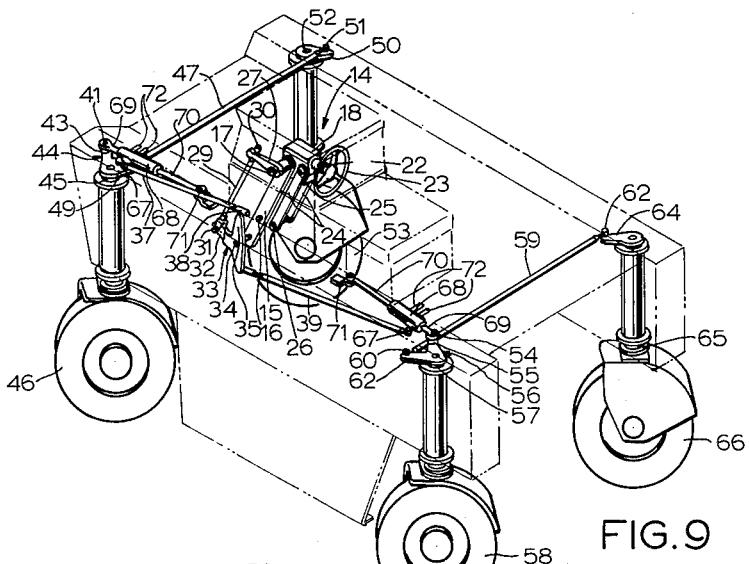
FIGURE 9 is an isometric view of a vehicle having the steering apparatus of FIGURE 1 embodied therein, with the front and rear wheels disposed in the positions shown in full lines in FIGURE 8 and showing the manner in which power piston and cylinder assemblies may be embodied in the steering apparatus.

Referring now to FIGURES 1 and 9, we have shown one form of steering apparatus embodying our invention which embodies control means indicated generally at 14 comprising a main control column or lever 15 extending generally vertically mounted intermediate its upper and lower ends for pivotal movement on a pivot pin 16 suitably secured to a rigid frame member or other component of the vehicle with its axis extending horizontally and transversely of the longitudinal axis of the vehicle. The upper end of main control lever 15 is journalled on a worm gear shaft 17 extending laterally outwardly to the left-hand side of a steering gear housing 18 for actuating the steering apparatus. The shaft 17 within housing 18 has fixed thereto a worm wheel sector or gear 19 which meshes with a worm 20 on a shaft 22 extending longitudinally of the vehicle and transversely of shaft 17. The worm shaft 22 extends rearwardly out of housing 18 and has a manually rotatable steering wheel 23 secured thereto at its outer end. A link 24 is pivotally connected at its upper end to the housing by pivot pin means 25, and at its lower end is pivoted on any suitable adjacent portion of the vehicle by pivot pin means 26, so as to extend in parallel relation with the main control lever 15. The column or lever 15 and link 24 thus provide for support of the housing 18 of the steering apparatus in the vehicle, defining a parallelogram linkage. A pair of links 24, one at each side of housing 18, may be employed instead of a single link.

Figure 2:
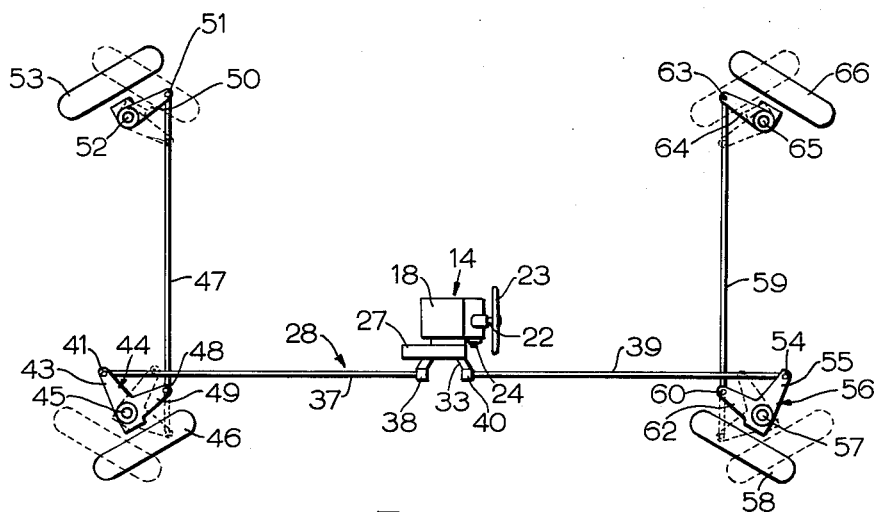
FIGURE 2 is a plan view of the steering apparatus of FIGURE 1, illustrating in full and broken lines certain positions in which the front and rear steering wheels of a vehicle may be disposed.

The worm gear shaft 17 at its outer end carries a crank or pitman arm 27 of wheel steering means, indicated generally by reference numeral 28, extending between control means 14 and the wheels of the vehicle. The outer end of the pitman arm 27 is pivotally connected to the upper end of a connecting rod or pitman 29 as by conventional ball and socket means 30. The lower end of pitman 29 has pivotal connection by known clevis and pin means 31 with the outer end of a first or middle arm 32 of a double or three-armed bell crank lever 33 which is pivotally connected as at 34 to the lower end of the main control lever 15 for rotation about a horizontal axis and is formed also with oppositely extending second and third arms 35 and 36. A front drag link 37 has pivotal connection at its inner or rear end as at 38 with arm 35 of bell crank lever 33, and a rear drag link 39 has pivotal connection at its inner end with arm 36 of the bell crank lever 33 as at 40. As best seen in FIGURES 2 and 9, the front or outer end of front drag link 37 has pivotal connection as at 41 with rearwardly extending arm 43 of a steering ball crank lever 44 which is connected to the upper end of a shaft 45, the rotation of which in a known manner effects turning movement of the left front wheel 46 of the vehicle. A tie rod 47 is pivotally connected at one end as at 48 to the other arm 49 of steering bell crank lever 44 and extends transversely at the forward end of the vehicle and is pivotally connected at its other end to a rearwardly directed steering lever 50 as at 51. The steering lever 50 has connection to the upper end of a shaft 52, the rotation of which effects turning movements of right front wheel 53 of the vehicle. Any turning movement imparted to the left front wheel 46 by longitudinal reciprocation of drag link 37 is correspondingly transmitted through tie rod 47 to the right front wheeel 53 of the vehicle, so that the pair of front wheels 46 and 53 are controlled in unison.

The outer or rear end of rear drag link 39 has pivotal connection as at 54 with one arm 55 of a steering bell crank lever 56 which is suitably connected to the upper end of a shaft 57, the rotation of which effects turning movement of the left rear wheel 58 of the vehicle. A tie rod 59 is pivotally connected at one end as at 60 to forwardly projecting second arm 62 of steering bell crank lever 56 and extends transversely of the vehicle for pivotal connection of its other end as at 63 to a steering lever 64. The steering lever 64 is connected to and extends forwardly from the upper end of a shaft 65 which has connection with the right rear wheel 66 of the vehicle. Thus, any turning movement imparted to the left rear wheel by the longitudinal reciprocation of drag link 39 is correspondingly transmitted by the tie rod 59 to the right rear wheel of the vehicle.

With the ground-engaging wheels of the vehicle all disposed parallel to the longitudinal axis of the vehicle, or in what may be called the straight-ahead position of the wheels, for movement of the vehicle forwardly or rearwardly in a straight line along its longitudinal axis, the control means 14 is disposed in its neutral or straight-ahead position. In this neutral position, the main column or control lever 15 is substantially vertical as shown in FIGURE 1, and the bell crank 33 is disposed as shown in dot-dash lines, with the pivot connection 38 of the front drag link 37 to the upper arm 35 of the bell crank axially aligned with the pivot pin 16 of the lever 15, the pivotal connection 38 and the lever pivot 16 being spaced from the pivot axis 34 of the bell crank 33 by the same distance. It will be evident that in this position the upper and lower arms 35 and 36 of the bell crank are in vertical alignment with the column or lever 15, with the pivot connections 38 and 40 of the front and rear drag links 37 and 39 to the bell crank substantially in the same vertical plane. The pivotal connections 38 and 40 are equally spaced from the pivotal mount 34 of bell crank 33.

The above-described steering apparatus provides for convenient steering of the vehicle in any desired direction on the ground. In this regard, and first considering the utility of the steering apparatus for effecting so-called four wheel steering, we shall first refer to FIGURES 1 and 2 of the drawings, in which it will be seen that main control lever 15 of control means 14 is disposed in substantially vertical position, the bell crank lever 33 being shown in a full-line position rotated counterclockwise from its neutral or dot-dash position, and in a dotted-line position rotated clockwise from its neutral position. This latter or dotted position corresponds to the positions of the vehicle wheels shown in dotted lines in FIGURE 2, for moving the vehicle through a right-hand turn, with both the front and rear pairs of wheels participating in the steering of the vehicle around the turn. The control means position of FIGURE 1 is reached from the neutral or straight-ahead position by rotation of hand steering wheel 23 in a clockwise direction, as viewed by the operator, which results in worm 20 effecting rotation of worm gear 19 in a clockwise direction, as viewed in FIGURE 1, in turn causing the outer end of pitman arm 27 to move clockwise, or upwardly. Pitman or connecting rod 29 is thus caused to move upwardly to effect rotation of bell crank lever 33 about its pivot axis 34 in a clockwise direction from its dotdash position as seen in FIGURE 1 to the dotted position. The clockwise rotation of bell crank lever 33 effects rearward longitudinal movement of drag link 37 which through its connection with steering lever 44 rotates shaft 45 clockwise and through tie rod 47 and its connection with steering lever 50 conjointly rotates shaft 52 to turn the left and right front wheels 46 and 53 to their dotted line positions shown in FIGURE 2, thus effecting a righthand turn as the vehicle moves forwardly. Concurrently with rearward longitudinal movement of drag link 37 as above described, rear drag link 39 is moved longitudinally forwardly by the aforementioned clockwise rotation of bell crank lever 33, which movement imparts counterclockwise rotation to steering bell crank lever 56 to effect rotation of shaft 57 and, through tie rod 59, like rotation of shaft 65 to thus effect movement of the left and right rear wheels 58 and 66 to the dotted line positions shown in FIGURE 2 and thus facilitate turning of the vehicle to the right.

It will be readily seen that through the aforedescribed linkage, upon turning of hand steering wheel 23 in a counterclockwise direction as viewed in FIGURE 2, the pair of front wheels 46 and 53 and the pair of rear wheels 58 and 66 may be disposed in their full line positions shown in FIGURE 2 to effect a left-hand turn of the vehicle. Thus, by reason of simple rotation of steering wheel 23 in the position of control means 14 shown in FIGURES 1 and 2, the four wheels of the vehicle may be disposed to effect a left or right turn.

If it is desired to steer the vehicle by turning of only the front wheels to the right or left with the rear wheels in the straight-ahead position, as in conventional automotive steering, this may be readily accomplished with the present steering apparatus. For a right turn, the gear housing 18 is pushed forwardly from the completely vertical or neutral position of the control means to swing the main control column or lever 15 counterclockwise as viewed in FIGURE 3 to the dotted-line position, and the wheel 23 is rotated clockwise about its axis. This movement of lever 15 effects bodily swinging of the bell crank lever 33 rearwardly to draw the front drag line 37 longitudinally rearwardly to effect clockwise rotation of the front steering bell crank 44 and its associated front steering lever 50 so as to turn the front wheels 46 and 53 to the right. The clockwise rotation of bell crank 33 on the lever 15 by the pitman 29 and pitman arm 27 as the result of the clockwise turning of the steering wheel additionally draws the pivot connection 38 of front drag link 37 and the bell crank rearwardly, but swings the pivotal connection 40 between the bell crank and the rear drag link 39 relatively forwardly to counteract its rearward movement. The pivot connection 40 is maintained in the neutral position vertically aligned with the control lever pivot 16, or returned to that position if it is moved therefrom during manipulation of the control means. The rear drag link 39 is thus held substantially immobile, so that the rear wheels 58 and 66 do not turn from the straight-ahead position. The rearward shifting of the front drag link 37 effected by the clockwise rotation of the bell crank 33 being cumulative or additional to that caused by the rearward bodily movement of the bell crank, reduces the rearward bodily movement of the bell crank required to effect turning of the front wheels to the right-turn or dotted-line position of FIGURE 4. Thus, the movement of the control means 14 necessary to accomplish this front wheel right-turn maneuver is considerably reduced, and the space required to accommodate such movement is correspondingly smaller.

Turning of the front wheels only to guide the vehicle in a left turn with the rear wheels maintained in the straightahead position is, from the straight-ahead position, accomplished merely by pulling the housing 18 rearwardly and rotating the steering wheel counterclockwise, from the neutral position of the control means. This brings the parts to the position shown in full lines in FIGURE 3, the rear drag link 39 being held substantially stationary, and the rear wheels thus maintained substantially in the straight-ahead position, by holding the pivot connection 40 between the drag link and bell crank 33 substantially in the vertical plane of the pivot axis 16 of the control lever 15, or returning the pivot connection 40 to such plane if it is moved therefrom, by the counterclockwise rotation of the bell crank resulting from counterclockwise rotation of the steering wheel 23. This effects counterclockwise rotation of the crank or pitman arm 27, transmitted through the connecting rod 29 to the bell crank 33, while the bell crank is moved bodily forward by the clockwise rotation of the control level 15 as a result of the rearward movement of the steering wheel and gear housing 18. This forward movement of the bell crank, together with the forward rotational movement of the upper arm 35 of the bell crank resulting from the counterclockwise rotation thereof, results in the swiveling of the front wheels 46 and 53 to the left-turn position, the forward drag link being shifted forwardly to turn the front steering bell crank 44 counterclockwise as viewed in FIGURE 4, and through the action of the front tie rod 47 on the front steering lever 50 effecting the turning of the right and left front wheels about their respective vertical swivel axes to the positions shown in full lines in FIGURE 4.

Figure 4:
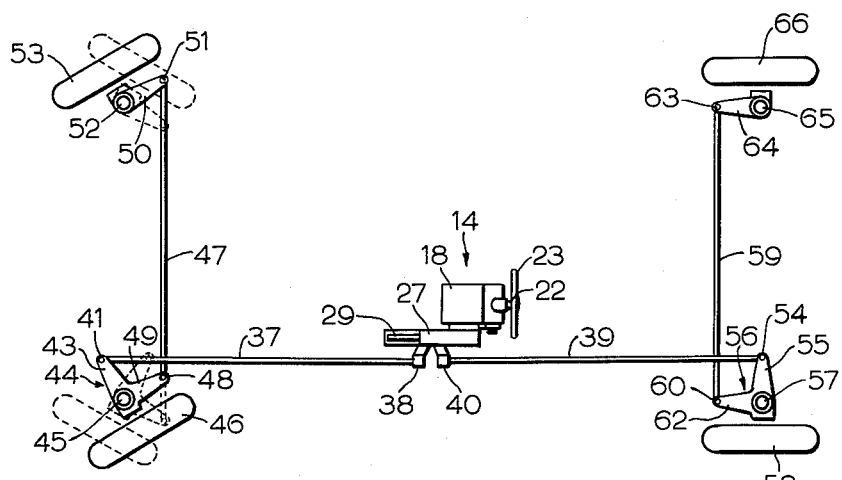
FIGURE 4 is a plan view of the steering apparatus of FIGURES 1 and 2, showing in full and broken lines different positions in which the front wheels of a vehicle may be disposed for effecting front wheel steering.

Should it be desired to turn the vehicle wheels from the four-wheel right-turn position of FIGURE 2 to the front-wheel-only right-turn position of FIGURE 4, or from the FIGURE 2 left-turn position to the left-turn position of FIGURE 4, the control means are operated substantially as in attaining the same positions from the straight-ahead position of al four wheels, but the degree of the movements will be different.

It will be apparent that in steering the vehicle by means of the front wheels only, the pivot connection 40 of the rear drag link to the bell crank 33 is held in or brought to its neutral position, locating the rear wheels in their straight-ahead positions, while the front drag link pivot 38 is moved to turn the front wheels right or left.

To steer the vehicle to the right from the neutral or straight-ahead position of all four wheels, by turning of the rear wheels only while maintaining the front wheels in the straight-ahead position, it is necessary merely to pull the gear housing 18 rearwardly from the vertical or neutral control position while turning the steering wheel 23 clockwise slightly. This brings the control means to the position shown in full lines in FIGURE 5, with the bell crank 33 being moved bodily clockwise by the rotation of the control lever 15 about its pivot 16 and rotated clockwise on the lever about its pivotal mounting 34, so that the pivot connection 38 of the front drag link 37 to the uper arm 35 of the bell crank remains coaxial with the lever pivot 16, that is, in the neutral position. The bell crank thus, in effect, swings about this pivot connection 38, so far as the forward drag link is concerned, and no movement of the drag link occurs. The pivot connection 40 of the rear drag link 39 to the lower arm 36 of the bell crank 33, however, is swung forwardly from its neutral position in the vertical plane of the pivot 16, and thus draws the rear drag link 39 forwardly to cause counterclockwise rotation, as viewed in FIGURE 6, of the rear steering bell crank 56 to correspondingly turn the swivel shaft 57 and thereby turn the left rear wheel 58 to the left to the full line position, by which the vehicle is caused to turn to the right. Through the tie rod 59, this rotation of the bell crank 56 causes corresponding rotation of the rear steering lever 64 and the swivel shaft 65 on which it is fixed, to cause the right rear wheel to turn to a position substantially parallel to that of the left wheel.

Figure 6:
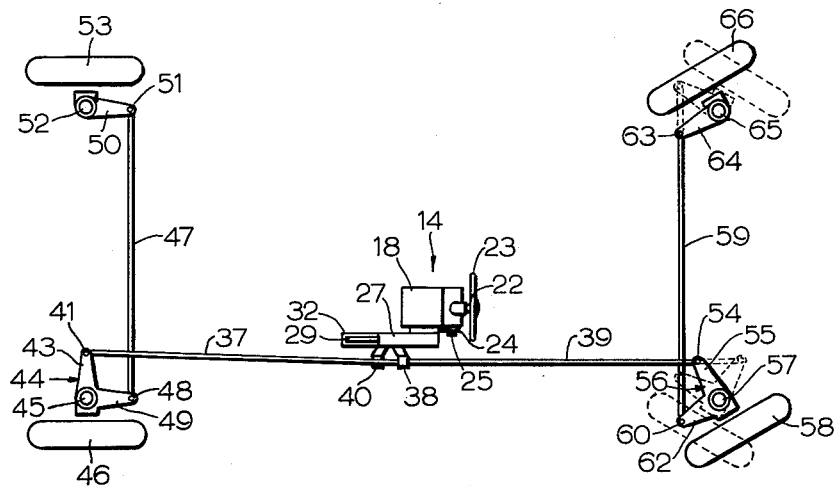
FIGURE 6 is a plan view of the steering apparatus of FIGURE 1, showing in full and broken lines different positions in which the rear wheels of a vehicle may be disposed for effecting rear wheel steering.
Figure 5:
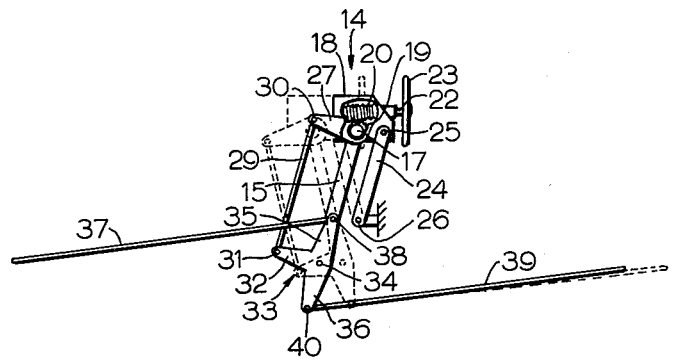
FIGURE 5 is a diagrammatic side elevational view of the steering apparatus of FIGURE 1, shown in another position for effecting rear wheel steering of a vehicle.

The rear wheels may similarly be rotated for effecting a left turn of the vehicle while maintaining the front wheels in the straight-ahead, solid-line position of FIGURE 6, from the neutral position, merely by moving the gearing housing 18 forwardly, and turning the steering wheel counterclockwise, to position the parts as indicated in dotted lines in FIGURE 5. As in effecting right turning movement of the rear wheels, the loctation of the pivot connection 38 of the front drag link 37 to the bell crank is thus held in coaxial relation with the pivot 16 of the lever 15, resulting in the drag link 37 being held stationary. The bell crank 33 thus in effect pivots about the axis of pivot 16 to swing the lower arm 36 counterclockwise, or rearwardly from its neutral position, thus shifting the rear drag link 39 rearwardly to effect clockwise rotation of the rear steering bell crank 56 and through the tie rod of steering lever 64 also to cause swiveling of both rear wheels to the left-turn or dotted-line position shown in FIGURE 6.

It will be obvious that turning of the wheels to the left-turn or dotted-line position from the right-turn or full-line position of FIGURE 6, or vice versa, may be accomplished very simply merely by moving the control means from the full-line position of FIGURE 5 to the dotted-line position, or vice versa.

It will also be evident that the steering of the vehicle in either direction by positioning of the rear wheels only in one or the other of the positions indicated in FIGURE 6, from either of the all-wheel steering positions of FIGURE 2, may readily be accomplished merely by shifting the control means from the vertical position of FIGURE 1 rearwardly to the full-line position of FIGURE 5 for a right turn, or to the dotted-line position of FIGURE 5 for a lift turn, while turning the steering wheel 23 clockwise or counterclockwise for respective clockwise or counterclockwise movement of the front drag link pivot connection 38 to the bell crank 33 into substantially coaxial relation with the pivot axis 16 of the lever 15, the direction of rotation of the steering wheel depending upon whether the pivot connection 38 was in the full-line or dotted-line position thereof, as shown in FIGURE 1.

Figure 8:
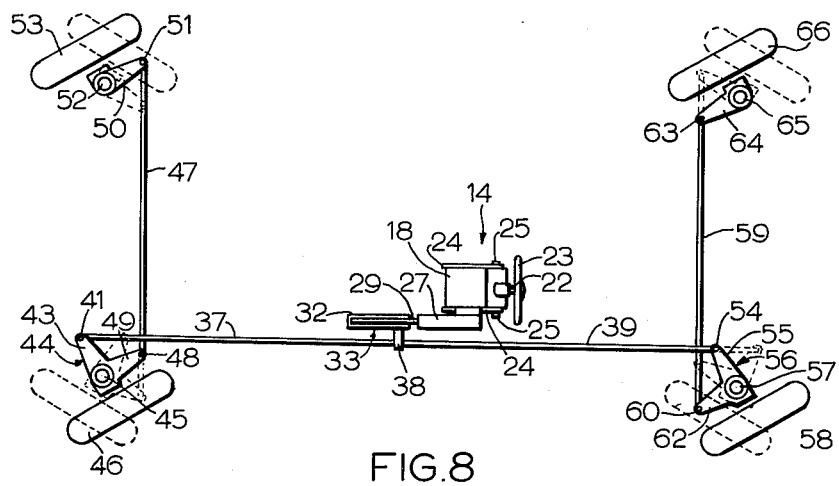
FIGURE 8 is a plan view of the steering apparatus of FIGURE 7 and showing in full and broken lines different positions in which the front and rear steering wheels of a vehicle may be disposed.
Figure 7:
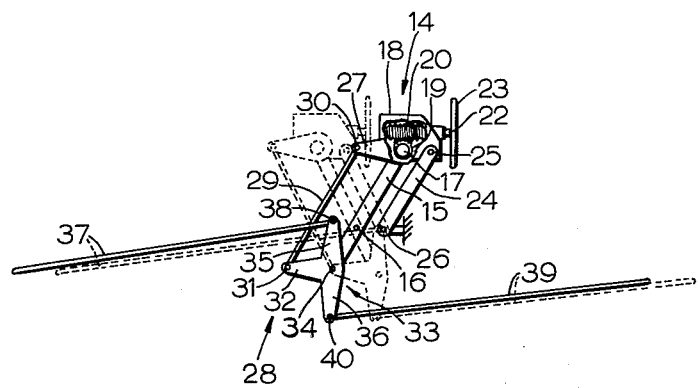
FIGURE 7 is a diagrammatic side elevational view of the steering apparatus of FIGURE 1 in still another position to dispose the front and rear wheels of a vehicle for effecting rectilinear movement of the same along a path transverse to its longitudinal axis.

In FIGURES 7, 8 and 9, there is shown "crab" steering, or positioning of all four wheels in the same direction, or in planes parallel to each other, to effect movement of the vehicle in a direction oblique to or otherwise transverse of the longitudinal axis of the vehicle. Such positioning of the wheels by the steering apparatus of our invention is very simply accomplished. With the control means in the neutral position, that is, with the pivot connections 38 and 40 of the front and rear drag links 37 and 39 to the bell crank 33 disposed in vertical alignment with each other and with the bell crank pivot 34 and control lever pivot 16, the gear housing 18 is drawn rearwardly, without rotation of the steering wheel 23, to bring the wheels to the left-diagonal or full-line position of FIGURES 8 and 9. This shifts both drag links forwardly the same distance to turn all the wheels in unison and to the same angle relative to the longitudinal axis of the vehicle, through the action of the drag links on the bell cranks and the consequent action of the tie rods and steering levers on the right-hand wheels. When it is desired to direct the vehicle to the right forwardly or to the left rearwardly, or in other words to turn the wheels to the dotted-line positions of FIGURE 8, the steering control means is moved forwardly so as to rotate the control lever 15 counterclockwise to move the bell crank 33 bodily to the rear with the pivot connections 34, 38 and 40 thereof in substantially vertical alignment. The bell cranks 44 and 56 are thus rotated clockwise, and through the tie rods 47 and 59 cause clockwise rotation of the steering levers 50 and 64, so that all four of the wheels are turned about their swivel axes to the left, as indicated in dotted lines in FIGURE 8. With the wheels in this position, it will be obvious that the vehicle would move in a diagonal direction, toward the right if moved forwardly, and toward the left if driven rearwardly.

It will, of course, be evident that the wheels may be turned to any desired angle relative to the longitudinal axis of the vehicle, from parallel thereto to a position perpendicular or normal thereto, so that the vehicle would move directly sidewise. This requires merely proper arrangement and proportion of the linkage parts.

It will be appreciated that, if desired, power means may be employed to assist, or even replace, manual movement of the drag links 37 and 39, to facilitate turning of the ground-engaging wheels in the desired direction or directions. Such power means may, of course, take various forms. In FIGURE 9, fluid motor means, specifically hydraulic cylinder and piston assemblies, are illustrated as exemplary of power means which may be employed.

The front and rear drag links are not connected directly to the front and rear steering bell cranks 44 and 56, but indirectly through fluid cylinder means. The outer or distal end of each drag link is pivotally connected as at 67 to an actuator for a valve formed as a self-contained moveable part of and controlling a double-acting hydraulic steering booster cylinder 68 having an axial projection or lug 69. The lug 69 of the forward cylinder is pivoted at 41 to the first arm 43 of the front steering bell crank 44, and the lug 69 of the rear cylinder 68 is pivoted at 54 to the first arm 55 of the rear bell crank 56, in place of the front and rear drag links, respectively. Acting within each cylinder 68 is a plunger or piston, not shown, carried on a piston rod 70 which projects out of the other end of the cylinder and is pivotally mounted as at 71 on the vehicle at any convenient point, the axis of the cylinder being disposed in a vertical plane adjacent and substantially parallel to the vertical plane of the associated drag link. Conduits 72 connect the opposite ends of each cylinder 68, at opposite sides of the piston acting therein, to a suitable source of hydraulic fluid under pressure (not shown) through the associated valve, so that the fluid may be controlled to effect extension or contraction of the cylinder, following the movement of the drag link 37 or 39 connected thereto, and provide power operation for the steering arrangement. It will be obvious that the cylinders 68 may be controlled otherwise than by the valves to which the associated drag links are respectively connected. For example, valving means operable by a manual lever to effect extension or contraction of the cylinders as desired might be provided. Instead of a hydraulic cylinder arrangement, a similar pneumatic arrangement employing compressed air or the like may be provided.

It will be apparent that by supplying fluid under pressure to one end or the other of either cylinder 68, it may be caused to move forwardly or rearwardly along the piston rod 70 and rotate the associated steering bell crank 44 or 56 clockwise or counterclockwise, as desired. For example, to bring the wheels to the oblique steering position of FIGURES 8 and 9 from the straight-ahead position with the control means in the neutral position, fluid would be supplied simultaneously to the forward ends of both cylinders 68 while opening the rearward ends to exhaust. The cylinders would therefore move forwardly on the rods 70, generally longitudinally of the vehicle, and thus move the front and rear steering bell cranks 44 and 56 counterclockwise to swivel the wheels 46 and 58 toward the left, and at the same time through the tie rods 47 and 59 effect similar turning of the wheels 53 and 66. It will be noted that the respectively associated drag links would be moved with the cylinders by reason of their pivotal connections 67 thereto, and thus would move the control bell crank 33 forwardly in its neutral or vertical position, so as to cause clockwise movement of the control lever 15 about its pivot 16, moving the gear housing 18 and steering wheel 23 rearwardly. Thus, manual force in effecting such movement of the control means may be greatly reduced or entirely eliminated, if desired. To bring the wheels to the right oblique or diagonal positions indicated by dotted lines in FIGURE 8, pressure fluid would be supplied to the rear ends of the cylinders and removed from the forward ends. The cylinders then would move rearwardly to effect clockwise turning of the wheels on their swivel shafts. It will be appreciated that the valving arrangement for the control of the cylinders includes means for opening both ends of either cylinder to supply or exhaust, so as to place the cylinder in a neutral condition, and allow one cylinder to be operated as desired for a particular movement of the associated drag link while the other drag link is disconnected or disassociated from power operation.

Figure 10:
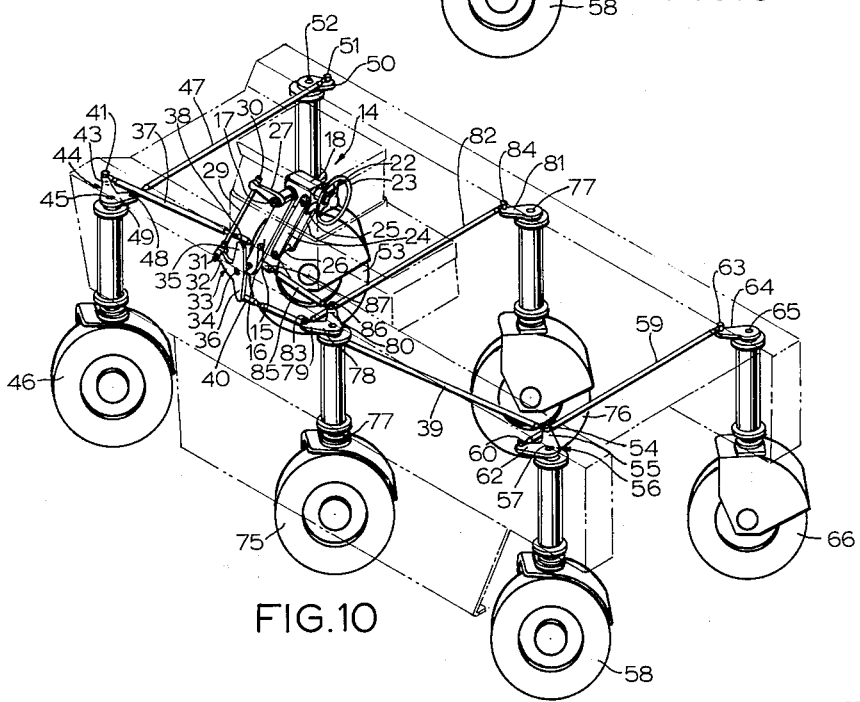
FIGURE 10 is an isometric view of another embodiment of steering apparatus of our invention embodied in a vehicle having six steerable wheels.

In FIGURE 10, there is illustrated an embodiment of our invention in which three pairs of wheels are employed, an additional or intermediate pair being provided between the front and rear pairs of the vehicle shown, for example, in FIGURE 9. The left and right intermediate wheels 75 and 76 are disposed along the left and right sides of the vehicle, respectively, each intermediate the front and rear wheels at the particular side. Each wheel 75 and 76 is mounted for turning about a vertical axis to a desired steering position by means of a vertical swivel shaft 77 suitably mounted on the vehicle. At the upper end of the shaft 77 of wheel 75 there is secured a steering bell crank 68 having a first arm 79 extending forwardly and a second arm 80 extending transversely toward the swivel shaft of wheel 76, in the neutral or straight-ahead position of wheel 75. A steering lever 81 is fixed on the upper end of the swivel shaft 77 of the right-hand wheel 76 to extend in parallel relation with the first arm 79 of the bell crank 78 on the swivel shaft of wheel 75, being arranged to extend forwardly when the wheel 76 is in the straight-ahead position. A tie rod 82 extends between the bell crank arm 79 and steering lever 81 to dispose them in the parallel relation noted, and is pivotally connected to the arm 79 and lever 81 as at 83 and 84, respectively, so that rotation of bell crank 78 in either direction will result in corresponding rotation of the steering lever 81, and thus the respective swivel shafts 77 of the wheels 75 and 76 will rotate in the same directions and to the same degree, the wheels thus always being disposed in parallel relation to each other. A third drag link 85 is provided connecting the bell crank 78 with the control bell crank 33, the drag link 85 having a suitable pivotal connection 86 with the second arm 80 of the bell crank 78, at its rearward end, and at its forward end being pivotally connected as at 87 to the lower end of control lever 15 and to control bell crank 33. The pivotal connection 87 is coaxial with the pivotal mounting 34 of the bell crank 33 on the lever 15, and thus is disposed in the plane of and midway between the pivotal connections 38 and 40 of the forward and rear drag links 37 and 39 to the bell crank 33. This location of the pivotal connection of the drag link 85 to the bell crank 33 midway of the connections of the forward and rear drag links to the bell crank 33 corresponds to the location of the wheels 75 and 76 midway between, respectively, the left wheels 46 and 58, and the right wheels 53 and 66.

It will be apparent that when turning of the vehicle is accomplished by rotation of the steering wheel 23, as described, for example, in connection with FIGURES 1 and 2, there will be no movement of the drag link 85 since its connection is at the pivot point of the bell crank 33 rotated by the steering wheel, and accordingly the wheels 75 and 76 will be maintained in the straight-ahead position. This straight-ahead position represents a position half way between the position assumed by the front wheels and that assumed by the rear wheels in the all-wheel steering positions illustrated in FIGURE 2. It will also be noted that by reason of the connection of the drag link 85 to the control lever 15 on the same axis as the pivot connection 34 between the lever 15 and the bell crank 33, the wheels 75 and 76 will be in the straight-ahead position when the lever 15 is in the vertical or neutral position.

As has been explained hereinabove, positioning of the wheels to achieve oblique or directly transverse steering of the vehicle is not effected by rotation of the steering wheel 23, but by movement of the control means to rotate the control lever 15 clockwise or counterclockwise to shift the control bell crank 33 bodily to the rear or front with the pivotal connections of the drag links thereto substantially in vertical alignment. Thus, the drag links are all moved the same distance to swivel the wheels on their vertical swivel shafts to the same angle. In FIGURE 10, the vehicle is shown with the wheels turned to steer the vehicle in a path oblique to the longitudinal axis of the vehicle, to the left in a forward direction and to the right in rearward movement, this position having been reached from the neutral or straight-ahead position by clockwise rotation of the control lever 15 from its vertical or neutral position with the bell crank 33 also disposed in a neutral position aligning the pivotal connections of the drag links thereto in the same vertical plane.

It will be evident that the six-wheeled arrangement of FIGURE 10 may be steered in substantially the same manner as described in connection with the four-wheeled arrangements as shown in FIGURES 1 to 9, inclusive, to obtain the positions of the wheels corresponding to the positions of the four wheels as illustrated in the several views. The positioning of the intermediate wheels when both the front and rear pairs of wheels are employed to turn the vehicle in one direction or the other, as shown in FIGURES 1 and 2, has already been explained. The operation by which the oblique or transverse steering is accomplished likewise has already been described.

Figure 3:
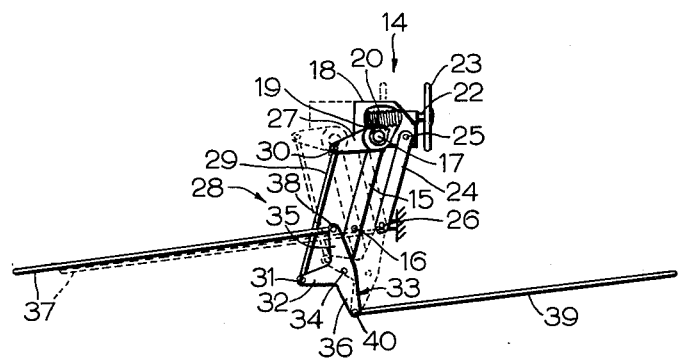
FIGURE 3 is a diagrammatic side elevational view in one position of the steering apparatus shown in FIGURE 1 for effecting front wheel steering of a vehicle.

If it is desired to steer the six-wheeled vehicle of FIGURE 10 substantially in the same manner as disclosed in connection with steering of the four-wheeled vehicle in FIGURES 3 and 4, and in FIGURES 5 and 6, that is, by turning only the front wheels or turning only the rear wheels, the control means is operated in the same way as explained in connection with FIGURES 4 and 6, respectively. Thus, to turn the front wheels 46 and 53 to the right and keep the rear wheels 58 and 66 directed parallel to the longitudinal axis of the vehicle, the control lever 15 is rotated counterclockwise by forward movement of the gear housing 18, and the steering wheel 23 is rotated clockwise to effect clockwise rotation of the bell crank 33 about pivot 34 on the lever 15, so as to maintain the pivotal connection 40 of the rear drag link 39 to the bell crank 33 in the vertical plane of the pivot 16 of the lever 15. The rear drag link is thus held against movement, and at the same time the front drag link 37 is drawn rearwardly to rotate the front wheels to the right about their vertical swivel axes, through the action of the linkage connecting the forward drag link to the swivel shafts 45 and 52. Similarly, if the front wheels are to be turned to the left while the rear wheels are maintained in the straight-ahead position, the control lever 15 is rotated clockwise and the steering wheel 23 is rotated counterclockwise to correspondingly rotate the bell crank 33 for forward movement of the front drag link 37 while disposing the pivotal connection 40 in its neutral position vertically aligned with the pivot 16. It will be apparent that since the pivotal connection 40 of the rear drag link to the bell crank 33 in each case is in effect held in the neutral or unmoved position while the pivotal connection 38 of the front drag link 37 to the bell crank moves in one direction or the other, swinging relatively about the pivotal connection 40, and since the pivotal connection 87 of the third drag link 85 to the bell crank 33 is half way between the connections 38 and 40, the drag link 85 will be moved in the same direction as the drag link 37, but only half as far, and consequently the steering bell crank 78 of wheel 75 and the steering lever 81 of wheel 76 will rotate through half the angular distance of the bell crank 44 and steering lever 50 of the front wheels. The wheels 75 and 76 thus will turn about their vertical axes only half the angular distance through which the wheels 46 and 53 turn, and thus to an angle half way between the angles made by the vertical plane of the rear wheels and the vertical planes of the front wheels with the longitudinal axis of the vehicle.

Similarly, when the front wheels are to be held in the straight-ahead position, and the rear wheels are to be turned to the right, the respective pivotal connections 40, 87 and 38 of the drag links 39, 85 and 37 to the bell crank 33 are disposed substantially in alignment with the pivotal axis 16 of the control lever 15, the pivotal connection 38 of the front drag link 37 being disposed substantially coaxial with the pivot axis 16, as in the case of the four-wheeled vehicle. The control lever 15 is then rotated counter-clockwise, shifting the rear drag link 39 rearwardly to turn the rear wheels 58 and 66 to the right in the manner previously described, while leaving the front drag link 37 unmoved because its pivotal connection 38 is at the neutral point, about which the pivotal connection 40 in effect rotates. Again, by reason of its disposition half way between the unmoving pivot axis of the connection 38 and the pivot axis 40 which moves rearwardly, the pivotal connection 87 of the third drag link 85 to the bell crank moves rearwardly with the drag link 39, but for only half the distance, so that the wheels 75 and 76 are turned to the right, but through only half the angle through which the rear wheels 58 and 66 are moved. Again, if the rear wheels are to be turned to the left, the control lever 15 is rotated clockwise, leaving the front drag link 37 unmoved, but drawing the rear drag link forwardly to effect counter-clockwise rotation of the rear wheels 58 and 66 about the vertical axes, and at the same time drawing the drag link 85 forwardly for half the distance moved by the drag link 39, so as to turn the intermediate wheels 75 and 76 in the same direction as the rear wheels, but through only half the angular distance.

It will be clear from the foregoing explanation that the intermediate wheels 75 and 76 always occupy a position half way between those of the front and rear wheels, the half way position in the case of four-wheel radial steering or turning being parallel to the longitudinal axis of the vehicle, and in the case of oblique or otherwise transverse steering being parallel to the front and rear wheel positions. Another way of stating this is that the intermediate wheels are positioned to follow along the line of movement of the vehicle determined by the front and/or rear wheels, so that there is a minimum of dragging, skidding, and scuffing, particularly when the vehicle is driven around a turn.

It may be pointed out that in the present instance, the intermediate wheels are disposed half way between the front and rear wheels, and that it is for this reason that the drag link 85 is pivotally connected to the control lever 15 and control bell crank 33 along the pivot axis of the bell crank. Intermediate wheels disposed forwardly or rearwardly of the longitudinal center of the vehicle would have their operating or steering drag links pivotally connected to the bell crank 33 at points spaced between the pivotal axis 34 thereof and the pivotal connections of the front and rear wheel drag links thereto, the drag links for the intermediate wheels being connected to the upper or lower arms 35 or 36 of the bell crank 33 as the intermediate wheels are located forwardly or rearwardly of the vehicle center, and the spacing of the pivotal connections of the intermediate wheel drag links along these bell crank arms being proportional to the spacing of the intermediate wheels along the length of the vehicle. Thus, for example, if two pairs of intermediate wheels were provided, spaced equally along the length of the vehicle between the front and rear wheels, the drag link of the intermediate pair of wheels forward of center would be connected to the upper arm 35 of bell crank 33 at a point corresponding to two-thirds of the distance from the pivotal connection 38 to the pivotal axis 34 of the bell crank. Similarly, the drag link for the intermediate pair of wheels rearwardly of the vehicle center would have the drag link connection thereof to the bell crank arm 36 at a point two-thirds of the distance from the pivotal connection 40 to the bell crank axis 34.

Figure 12:
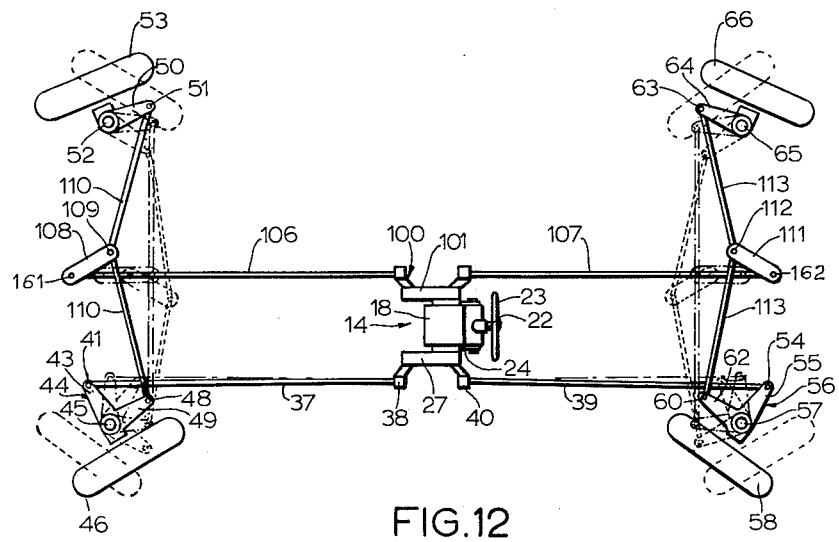
FIGURE 12 is a plan view of the steering apparatus of FIGURE 11.
Figure 11:
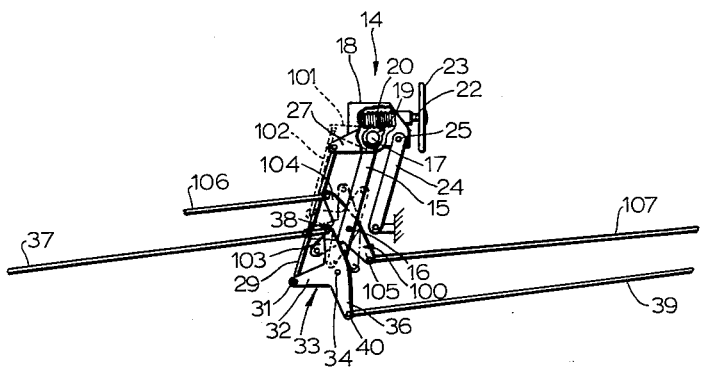
FIGURE 11 is a diagrammatic side elevational view of another embodiment of steering apparatus of our invention similar in most respects to that shown in FIGURES 1 through 10, but embodying means for effecting splay.

Steering apparatus according to the invention, as already disclosed, but embodying means to provide splay, is disclosed in FIGURES 11 and 12. Splay may be defined herein as the difference in steering angle between the wheels of a pair of normally spaced wheels during turning of the vehicle. By the splay means, the wheels of a pair of wheels in turning of the vehicle are guided to move tangentially of the respective arcs they should follow about the system steering center for the particular turn of the vehicle. In other words, each wheel is prevented from deviating from its prescribed arc of travel and seeking its own arc of travel in response to the frictional or other characteristics of the surface over which it passes, such as unevenness, so that it may move easily around the turn and avoid undue wear. The difference in the angles of the wheels results in the intersection of their axes substantially at the system steering center. This is true of each pair of wheels used for steering during the turn.

The splay-providing means comprises a triple-throw lever, or three-armed or double bell crank, 100, which is pivoted on the axis of the pivot mounting 16 of control lever 15, and arranged to be moved about that axis in union with the rotation of the bell crank 33 about its pivot axis 34 on the lever 15. One manner of accomplishing this, as shown in FIGURES 11 and 12, is to mount the bell crank 100 at the right side of the gearing casing 18, on the axis of the pivot 16, and to extend the worm gear shaft 17 to the right so as to project outwardly of the gear casing housing 18. On this projecting end of the worm gear shaft is fixed a second crank or pitman arm 101 substantially identical to the pitman arm 27 in circumferential location and radial extent relative to the shaft 17. A connecting rod or pitman 102 is pivotally connected at one end to the arm 101 and at the other end to the operating or middle arm 103 of the bell crank 100, so that rotation of the shaft 17 will cause rotation of the arms 27 and 101 in correspondence to each other to move the bell cranks 33 and 100 in unison with each other. The upper and lower arms 104 and 105 of the bell crank 100, extending oppositely from each other and substantially normal to the middle arm 103, are arranged generally parallel to the upper and lower arms 35 and 36 of the bell crank 33. A forwardly extending drag link 106 is pivotally connected at its rear end to the upper arm 104, and a similar, but rearwardly extending, drag link 107 is pivotally connected at its forward end to the lower arm 105. The other or forward end of drag link 106 is pivotally connected at 161 to a pivot block or link 108 which extends rearwardly therefrom and is pivotally connected at this rearward end as at 109 to the inner or central ends of a pair of tie rod halves 110 which at their laterally outer ends are pivotally connected to the right steering lever 50 as at 51 and to the second arm 49 of the front steering bell crank 44 as at 48, the two tie rod halves 110 replacing the front tie rod 47. The rear end of drag link 107 is similarly pivotally connected at 162 to a pivot block 111 extending forwardly and pivoted at its forward end, as at 112, to the central or laterally inner ends of a pair of tie rod halves 113 extending transversely between the rear wheels, with one connected at its laterally outer end to the rear steering lever 64 as by the pivot connection 63 and the other connected at its laterally outer end as by pivot 63 to the second arm 62 of the rear steering bell crank 56. In neutral position, pivots 161 and 162 are transversely aligned with the turning centers of the steering bell cranks and levers. As in the case of the front tie rod halves 110, the rear tie rod halves 113 replace the rear one-piece tie rod 59, extending transversely between the rear wheels 58 and 66.

When a turn is to be made to the left by the vehicle, by means of all four wheels, as in the case of FIGURES 1 and 2, so that the wheels are disposed in the solid line positions shown in FIGURE 12, with the wheels initially in the straight-ahead position and the control means in the neutral or vertically aligned relation described and illustrated in FIGURE 1, the steering wheel 23 is rotated counterclockwise so as to effect rotation of the control bell crank 33 clockwise, and through the operation of the second crank or pitman arm 101 and pitman 102 to effect corresponding movement of the bell crank 100.

As explained in connection with FIGURES 1 and 2, the counterclockwise rotation of bell crank 33 results in longitudinally outward movement of the forward and rear drag links 37 and 39 to rotate the left front and rear wheels to the solid line positions illustrated in FIGURE 12. Through the transversely extending tie rods defined respectively by the halves 110 and 113, similar turning of the right front and rear wheels is effected. In the neutral position of the control means, corresponding to the straight-ahead position of the wheels, the halevs of both the front and rear tie rods are in transverse alignment, as shown by dash-dot lines in FIGURE 12, and extend substantially straight between the steering bell cranks on one side of the vehicle and the steering levers on the other side, so that they serve to hold the wheels in the parallel positions. It may be noted here that the effective length of the pivot blocks 108 and 111, i.e. the distance between the forward and rear pivotal axes of each, is substantially equal to the effective lengths of the bell crank arms and steering levers, and the front and rear drag links 106 and 107 are of such length that in the neutral position their pivot connections to the respective blocks 108 and 111 lie in transverse alignment with the swivel shafts of the front and rear wheels, respectively. Thus, each pivot block has its pivotal connection to the associated tie rod halves disposed in transverse alignment between the pivotal connections of the tie rod halves to the respective steering bell cranks and steering levers, such alignment, of course, corresponding to the aligned or straight-line condition of the tie rod halves. Guide means of any conventional type are provided on the vehicle to hold the outer ends of links 106 and 107, or the pivotal connections of the pivot blocks 108 and 111 thereto, against lateral movement and guide the same for directly longitudinal movement.

As the steering bell cranks 44 and 56 are rotated by the movements of the front and rear drag links to swivel the left front and rear wheels 46 and 58 to the full-line positions shown, the front and rear drag links 106 and 107 are moved longitudinally outwardly by the counterclockwise rotation of the splay bell crank 100 in unison with the bell crank 33, and thus move the pivot blocks 108 and 111 longitudinally outwardly. This results in each pivot block drawing the tie rod halves associated therewith into angular relation with each other, as shown in full lines, to dispose the pair of wheels between which they extend at a slight angle to each other, instead of parallel. The angular disposition of the rod halves 110 results in the pivotal tie rod connections 48 and 51 to the front bell crank arm 49 and front steering lever 50, respectively, to be disposed closer to each other than when the tie rod halves are aligned. In other words, the steering lever and the bell crank arm 49 are drawn into rearwardly converging relation, and the front wheels 46 and 53 are toed out relative to each other. The same action takes place in the case of the rear tie rod halves 113 and the steering lever 64 and arm 62 of bell crank 56, but since this lever and arm extend forwardly from the vertical swivel shafts, the rear wheels 58 and 66 are brought to a condition toeing in toward each other. It may be noted that if the vehicle is driven in reverse, the rear wheels become the "front" or leading wheels, and are now regarded as toed or splayed outwardly, while the front wheels become the "rear" or trailing wheels, and are toed in toward each other, in the direction of vehicle travel. If all four wheels are turned as explained in connection with FIGURES 1 and 2 to turn the vehicle to the right, into the dotted-line positions of FIGURE 12, the drag links 106 and 107 are drawn longitudinally inwardly to bring the respective tie rod rod halves into the angled relation to each other shown in dotted lines, opposite to that they assume when the links 106 and 107 are shifted outwardly. The same angular relationship between the wheels of each pair results as in the left turn operation. If only one pair of wheels is turned, only the tie rod halves extending therebetween operate as described.

The left wheels are turned in one direction or the other by the drag links 37 and 39, through arcs having fixed relation to the longitudinal movements of the drag links. By reason of the geometry of the linkages provided by the drag links 106 and 107, the tie rod halves 110 and 113, and pivot blocks 108 and 111, respectively, and the guiding of movement of the outer ends of these drag links longtiudinally of the vehicle, the right wheels are rotated through shorter arcs than the left wheels when the several drag links are moved longitudinally outwardly, for turning the vehicle to the left, and are turned through longer arcs than the left wheels when the drag links are drawn longitudinally inwardly, for a right turn of the verhicle. Thus, the inside wheel of each pair of steering wheels is "cramped" or turned more sharply than the outside wheel in turning of the vehicle, whether one or more pairs of wheels are employed in the turn. This splay, that is, the difference in the arcs through which the inside and outside wheels are turned about the axes of the vertical swivel shafts, or the difference in angles assumed by the wheels in turning of the vehicle, corresponds to the difference in the turning radii of the wheels about the steering center, to dispose the wheels substantially in tangency to the arcs they follow.

The splay-effecting apparatus of FIGURES 11 and 12 will provide "crab" steering for oblique or other sidling movement of the vehicle, in the same manner as the apparatus of FIGURES 1 to 9, without splaying of the wheels, which are turned to positions parallel to each other. To turn the wheels from the straight-ahead position to a crab-steering position, the control lever 15 is rotated about its pivot 16 in one direction or the other from the neutral condition of the control means, as previously explained in connection with FIGURES 7 to 9, without turning of the steering wheel 23. This causes longitudinal movement of both drag links 37 and 39 in the same direction and to the same extent, but does not effect any movement of the drag links 106 and 107, which are actuated only by rotation of the steering wheel. Accordingly, the pivotal connections 161 and 162 of the links 106 and 107 to their respective pivot blocks 108 and 111 remain in their neutral positions. The steering bell cranks and levers with the pivot blocks and the associated pairs of tie rod halves 110 and 113, it will be evident, define a parallelogram linkage between each pair of wheels. Thus, the longitudinal movement of the drag links 37 and 39, turning the steering bell cranks 44 and 56, causes the pairs of tie rod halves to be shifted transversely and also forwardly or rearwardly, each as a unit, to turn the steering levers 50 and 64 with the bell cranks 44 and 56. The pivot blocks 108 and 111 swing about their pivotal connections 161 and 162, parallel to, and through the same angles or arcs as, the steering bell cranks and steering levers, so as to accommodate this movement of the tie rods in the steering operation. By reason of the parallelogram linkages provided by the tie rods and pivot blocks with the steering bell cranks and levers, there is no "breaking" of the tie rods, which thus hold the wheels of each pair in parallel relation and bring the right wheels to the same steering angle as the left wheels, without any splay or difference in the steering angles.

In FIGURES 1 to 12 inclusive, our invention has been disclosed as incorporating a lever linkage arrangement by which movements of the control means are transmitted to the wheels to turn them to the desired steering positions. Other means may be employed for this purpose, however, and one possible modified arrangement is illustrated in FIGURES 13 and 14, by way of example.

Figure 14:
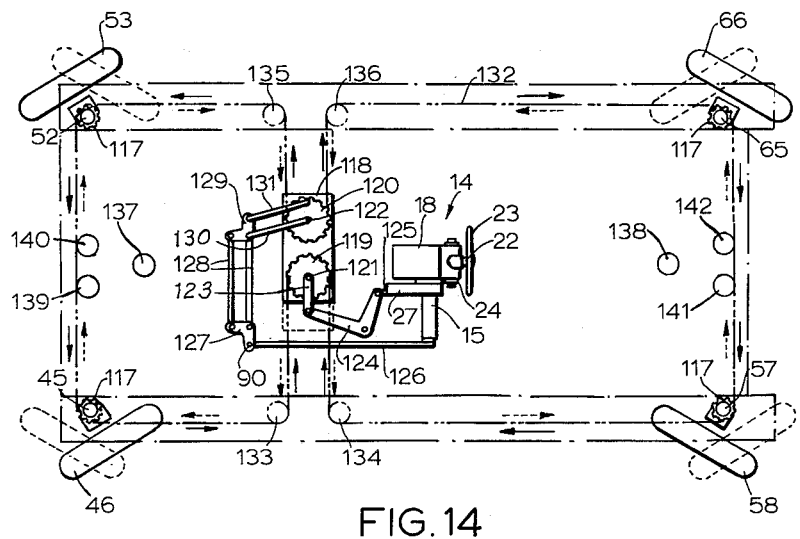
FIGURE 14 is a plan view of the steering apparatus shown in FIGURE 13 applied to a vehicle having four steerable wheels.
Figure 13:
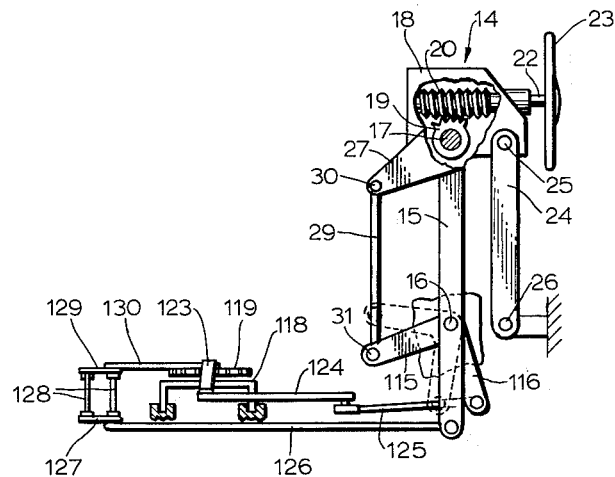
FIGURE 13 is a diagrammatic side elevational view of still another embodiment of a steering apparatus constructed in accordance with the principles of our invention.

The structure of FIGURES 13 and 14 is generally similar to that of FIGURES 1 through 12 so far as the control means are concerned, having the control means 14 including the control lever 15 pivoted at 16, with the steering wheel 23 controlling the worm 20 by its shaft 22 to operate the worm wheel sector or worm gear 19 to rock the gear shaft 17 for rotating the crank or pitman arm 27 thereon. The gear housing 18 is mounted on the parallelogram linkage including the lever 15, pivoted at its upper end on the shaft 17, and the links 24 pivoted at their upper ends to the housing at 25 and at their lower ends to the vehicle as at 26. A connecting rod or pitman 29 has its upper end pivoted as at 30 to the arm 27, and its lower end pivotally connected as at 31 to a forwardly extending arm of bell crank 115 mounted on the lever 15, the other arm 116 being connected as hereinafterdescribed. Unlike the bell cranks 33 and 100, the bell crank 115 has only the usual two arms although like bell crank 100 it is pivoted to rotate on the pivot axis 16 of control lever 15, with the arm 116 in generally depending position. Since the bell crank 115 is mounted on the pivot axis of the control lever 15, it is not affected by movement of the lever. The wheels 46, 53, 58 and 66 are respectively provided with the vertical swiver shafts 45, 52, 57 and 65 as previously disclosed, but in place of the steering bell cranks and steering levers, each shaft has fixed thereon a sprocket 117. The drag links, tie rods, and other associated parts are replaced by the mechanism illustrated in FIGURES 13 and 14.

This mechanism comprises a horizontal base or platform 118 mounted on the vehicle by any conventional means for transverse sliding movement. Rotatably mounted on the platform 118 are first and second sprocked wheels 119 and 120, which, as described hereinafter in connection with FIGURES 19 and 20, may be arranged for movement on the platform transversely of the vehicle, the sprocket wheels 119 and 120 being rotatable on shafts or pins 121 and 122, respectively. The transverse movement of the platform 118 is effected by movement of the bell crank 115, transmitted to the platform by a shifting link 123, one end of which is pivoted to the platform, as on the shaft or pin 121 of sprocket wheel 119, and the other end of which is pivotally connected to a forwardly extending arm of a horizontally disposed bell crank 124 suitably pivoted on the vehicle and having its other arm pivotally connected to one end of a connecting rod 125, the other end of which is pivotally engaged with the depending second arm 116 of the bell crank 115. It will be evident that upon rotation of the bell crank 115 clockwise as viewed in Figure 13, which may be accomplished by clockwise rotation of steering wheel 23 to cause clockwise rotation of the pitman arm 27, as previously explained, the rod 125 is moved longitudinally forwardly, turning the bell crank 124 counterclockwise as viewed in FIGURE 14 to shift the link 123 transversely of the vehicle, in this case to the left, and thus similarly move the slidable platform to the left. It will also be evident that counterclockwise rotation of bell crank 115 will similarly effect sliding movement of the platform 11 transversely to the right. The shifting link 123, of course, may be pivoted directly to the platform instead of by means of the pin 121.

The lever 15 is linked to the other or second sprocket wheel 120 in a manner to effect rotation thereof in either direction. To the lower end of the lever is pivotally connected one end of a forwardly extending link 126, to the other end of which is pivoted one arm of a horizontally disposed bell crank 127 pivoted on the vehicle. The other arm of bell crank 127 is pivotally connected by one of a pair of parallel links 128 to another bell crank 129 spaced from bell crank 127 transversely of the vehicle and disposed adjacent the second sprocket wheel 120. The other link 128 has its ends pivotally engaged with the corner or angle portions of the two bell cranks 127 and 129, so as to provide pivots for the bell cranks, and define therewith a parallelogram linkage. Pivotally mounted on the pivotal axis of the bell crank 129 provided by the second link 128 is an arm 130 which projects over the platform 118 and carries the axle or pivot pin 122 on which the sprocket wheel 120 rotates. Pivotally connected to the other arm of the bell crank an and eccentric point on the sprocket wheel 120 is a turning link 131. By means of the linkage just described, the sprocket wheel may be rotated in either direction through a limited angle by movement of the control lever 15. Upon counterclockwise rotation of the lever, the link 126 is drawn rearwardly, rotating bell crank 127 counterclockwise about its connection to the second link 128 to draw the first connecting link 128 transversely of the vehicle, to the left side as viewed in FIGURE 14, so that the bell crank 129 is rotated with bell crank 127, counterclockwise as viewed in the figure. The turning link 131 is thus moved generally forward to turn sprocket wheel 120 counterclockwise about its axle or pin 122. In the same, though reverse, manner, clockwise rotation of the control lever 15 about its pivot 16 effects clockwise rotation of the sprocket wheel by rearward thrust of the link 131. It will be appreciated that the arm 130 and turning link 131 provide a parallelogram linkage which cooperates with the linkage defined by the bell cranks 127 and 129 and links 128 in allowing the sprocket wheel 120 to move with the platform 118, accommodating to the movements of the platform.

An endless sprocket chain 132 is trained about the four sprockets 117 and the sprocket wheels 119 and 120, the run along the left side of the vehicle, or between the wheels 46 and 58, being diverted inwardly about longitudinally spaced idler sprockets 133 an 134 to extend about sprocket wheel 119, and the run at the other side similarly being passed about idler sprockets 135 and 136 to be reeved about sprocket wheel 120. The chain 132 may also, if desired, be trained about front and rear sprockets 137 and 138, rotatably mounted, respectively, rearwardly and forwardly of the front wheel sprockets 117 and the rear wheel sprockets. Idler sprockets 139 and 140 are rotatably mounted in laterally spaced relation to each other forwardly of sprocket 137, and idler sprockets 141 and 142 are similarly arranged rearwardly of sprocket 138. The sprockets 137 to 142, inclusive, need not be provided, if not desired.

In operation of the steering apparatus of FIGURES 13 and 14, when it is desired to turn the wheels from their straight ahead positions to the full-line positions of FIGURE 14 to steer the vehicle in a left turn by means of all four wheels as described and shown in connection with FIGURE 2, the steering wheel 23 is rotated counterclockwise with the control means 14 in neutral position. In this neutral position, the control lever 15 is vertical and the bell crank 115 is disposed with its depending arm 116 angled slightly forward from the vertical, as shown in dotted lines in FIGURE 13. The neutral position of the control means is also shown clearly in FIGURE 19. The counterclockwise rotation of the steering wheel, as previously explained, effects lateral shifting of the platform 118 transversely or laterally to the right, as shown in full lines in FIGURE 14. The chain is thus drawn inwardly over the idler sprockets 133 and 134 by sprocket wheel 119, and paid out over sprockets 135 and 136, with substantially no rotation of sprocket wheels 119 and 120. Accordingly, the forward portion of the chain, forwardly of the sprocket wheels 119 and 120, moves counterclockwise about sprocket 135, sprockets 117 of the front wheels 46 and 53, and sprocket 133, as indicated by the arrows in full lines, to turn the front wheels correspondingly, or to the left; and the rear portion of chain 132 moves clockwise about idler sprockets 134 and 136 and the rear wheel sprockets 117 to turn the rear wheels to the right to follow substantially the same arc as the front wheels. The chain may be trained about sprockets 137 and 138, if desired, and in such case pass idly thereover. Since the length of chain paid out from each run extending from the second sprocket wheel 120, and added to the length of each run extending to the first sprocket wheel 119, is identical, all the wheels turn through the same angular distance. If the wheels are to be turned to the right-turn or dotted-line positions of FIGURE 14, the steering wheel 23 is turned clockwise, with the control means in neutral position, to effect transverse movement of the platform 118 to the left, as shown in dotted lines, so that the chain 132 turns the wheel sprockets in directions opposite to those described for the left-turn operation to bring the wheels to the desired positions. In neutral position, the platform 118 is disposed substantially midway between its full-line and dotted-line positions in FIGURE 14

Figure 15:
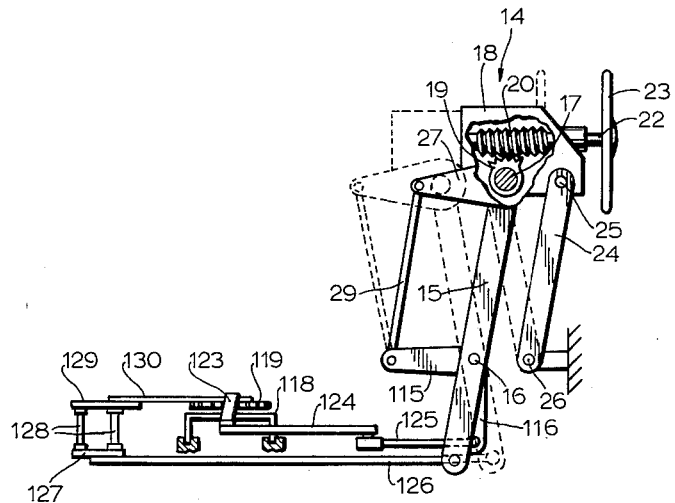
FIGURE 15 is a diagrammatic side elevational view of the steering apparatus of FIGURE 13 in a position for disposing the wheels of a vehicle to direct the same in a path transverse to the longitudinal axis of the vehicle.

When it is desired to turn the vehicle wheels from straight-ahead position to effect "crab" steering of the vehicle, to the left or right in a straight line obliquely to or otherwise transversely of the longitudinal axis of the vehicle, substantially as in FIGURES 7 to 9, the control lever 15 is simply rotated in one direction or the other about its pivot 16, the bell crank 115 being in its neutral position as shown in FIGURE 15. If the wheels are to be turned to the left forward oblique steering positions shown in full lines in FIGURE 16, the lever 15 is turned clockwise as viewed in FIGURE 15, without rotation of the steering wheel 23, to cause clockwise rotation of sprocket wheel 120 as already explained. This causes the chain 132 to move in the direction indicated by the solid arrows in FIGURE 16, counterclockwise about the wheel sprockets 117, correspondingly turning the wheels about their vertical axes, all in the same direction and through the same arc or angle, to dispose them in parallel planes diagonally of the longitudinal axis of the vehicle, substantially as shown in full lines. If the wheels are to be turned to the dotted-line positions of FIGURE 16, to steer the vehicle in a straight line to the right forwardly or to the left rearwardly, the control lever 15 is rotated counterclockwise, the steering wheel 23 not being turned, to effect counterclockwise turning of the sprocket wheel 120. The sprocket chain 132 therefore is moved in the direction indicated by the dotted arrows, or in other words so as to turn all of the wheel sprockets 117 clockwise, thus causing rotation of the wheels on their respective swivel shafts to the right substantially to the dotted-line positions. From either of the oblique-steering positions, the vehicles are returned to the straight-ahead positions merely by returning the control lever 15 to its neutral or vertical position.

Figure 17:
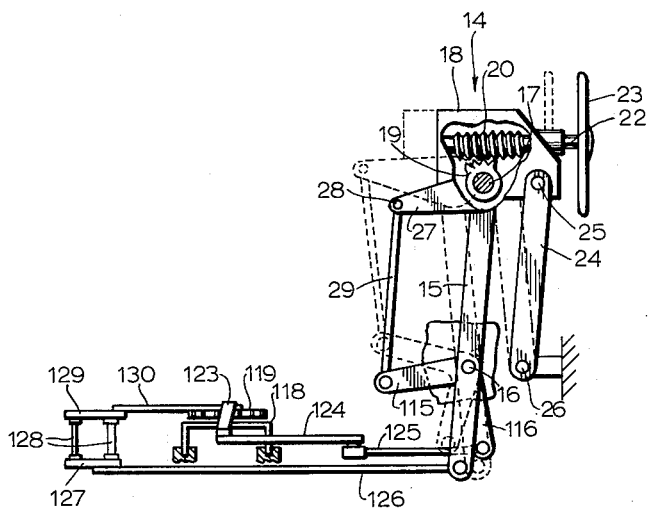
FIGURE 17 is a diagrammaitc side elevational view in one of its positions of the steering apparatus shown in FIGURES 13 and 14 for effecting front wheel steering.

When it is desired to turn the vehicle in one direction or the other by means of the front wheels only, with the rear wheels in the straight-ahead position, as in conventional automotive steering, the steering wheel and control lever are operated together. With the control lever 15 and bell crank 115 in the neutral positions thereof, as shown in FIGURE 19, and thus with the wheels in the straight ahead position, the gear housing 18 is moved rearwardly as in FIGURE 17 so as to rotate the lever 15 clockwise, and the steering wheel 23 is rotated counterclockwise, to turn the front wheels to the left-turn or full-line position shown in FIGURE 18. The clockwise rotation of the control lever, as heretofore described, causes clockwise rotation of the sprocket wheel 120, thus causing movement of the chain 132 in a direction to turn the wheel sprockets 117 of the front wheels in a counterclockwise direction so as to turn the wheels about their swivel shaft axes to the left, or counterclockwise, substantially to the positions shown in solid lines. The chain, of course, would also cause counterclockwise rotation of the rear wheel sprockets 117, but the counterclockwise rotation of the steering wheel 23 acts to cause shifting of the platform 118 transversely of the vehicle to the right as previously described. The sprocket wheel 119 is moved with the platform, without turning, to move the chain inwardly over the idler sprockets 133 and 134, and outwardly over the sprockets 135 and 136. It will be seen that while this movement is compatible with the movement of the portion of the chain forwardly of the sprockets 119 and 120 effecting turning of the front wheels, it is in opposition or in the opposite direction to movement of the rear portion of the chain caused by the operation of control lever 15 and consequent clockwise rotation of sprocket wheel 119, since it would cause clockwise rotation of the rear wheel sprockets 117. Thus, it counteracts or neutralizes the counterclockwise rotation of the rear wheel sprockets which would result from the chain movement caused by operation of the lever 15. The rear wheels thus are held substantially stationary, and remain in the straight-ahead position shown in full lines in FIGURE 18.

To steer the vehicle to the right by means of the front wheels only, the gear housing 18 is moved forwardly to rotate the control lever 15 counterclockwise from its neutral position, and the steering wheel substantially simultaneously is rotated clockwise to rotate the bell crank 115 clockwise from its neutral position. The movement of control lever 15 results in counterclockwise rotation of sprocket wheel 120 by link 131, in the manner explained in connection with FIGURES 15 and 16, while the clockwise rotation of steering wheel 23 results in shifting of the platform 118 transversely of the vehicle to the left, in the same manner explained in connection with FIGURES 13 and 14. The turning of sprocket wheel 120 causes movement of the forward portion of the chain 132 to turn the front wheel sprockets 117, and hence the front wheel swivel shafts and the front wheels, in a clockwise direction, while the movement of the rear portion of the chain resulting from the rotation of sprocket wheel 120 is neutralized and counteracted by the transverse movement of platform 118 to the left resulting from operation of the steering wheel, by which the chain is paid out over the idler sprockets 133 and 134 while being drawn inwardly at the opposite side over the wheel sprockets 135 and 136.

Figure 18:
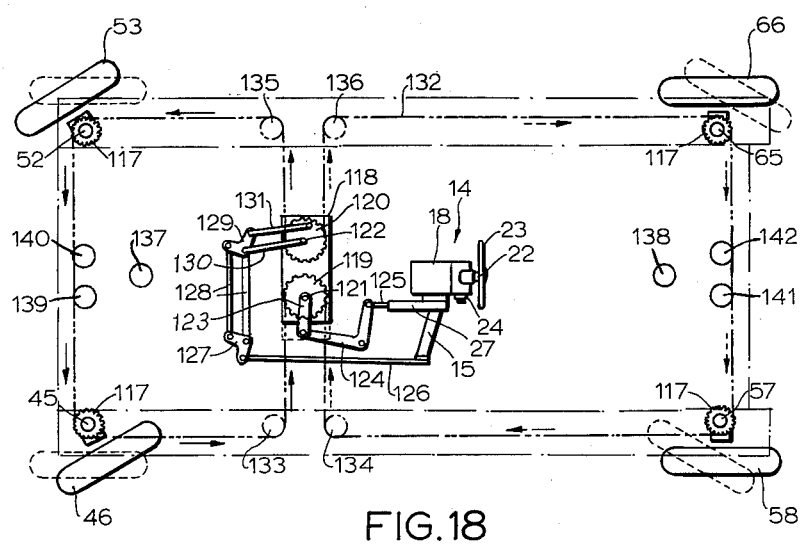
FIGURE 18 is a plan view of the steering apparatus of FIGURES 13 and 14, showing in full and broken lines different positions in which the front wheels of a vehicle may be disposed for effecting front wheel steering.

If it is desired to steer the vehicle by turning of the rear wheels in one direction or the other while maintaining the front wheels in the straight-ahead position, indicated in dotted lines in FIGURE 18, this may be done by reversing the operations described for front wheel steering. Thus, if it is desired to turn the vehicle to the left by means of the rear wheels, the rear wheels 58 and 66 are to be turned or cocked to the right, substantially to the positions indicated in dotted lines in FIGURE 18. To accomplish this, the control lever 15 is rotated counterclockwise by forward movement of the gear housing 18, while the steering wheel 23 is rotated counterclockwise to rotate the bell crank 115 correspondingly. As explained hereinabove, the counterclockwise rotation of control lever 15 results in counterclockwise turning of sprocket wheel 120, and thus effects movement of chain 132 in a direction such as to turn the wheel sprockets 117 clockwise. At the same time, the counterclockwise rotation of the steering wheel results in shifting of the slidable platform 118 to the right, so that the sprocket wheel 119 draws the chain inwardly or transversely of the vehicle to the right over the idler sprockets 133 and 134. The movement of the sprocket wheel 119 thus is in the same direction as the movement of the rear portion of the chain caused by rotation of the sprocket wheel 120, and in effect takes up as slack the length of chain which otherwise would pass about the sprocket wheel 119, the sprocket wheel thus not rotating during its transverse movement. As to the forward portion of the chain 132, however, the movement of the sprocket wheel 119 is in the direction opposite to that imparted to the chain by the rotation of the sprocket wheel 120, so that the two sprocket wheels in effect act in opposition to each other in that the forward portion of the chain is drawn by sprocket wheel 119 to move in a direction causing counterclockwise rotation of the front wheel sprockets 117. Thus, the movement of the chain in one direction is counteracted by movement in the other direction, so that it remains stationary relative to the front wheels, and the wheel sprockets 117 are not rotated, remaining substantially stationary, and the front wheels are maintained in the straight-ahead position shown in dotted lines in FIGURE 18.

Similarly, if the vehicle is to be turned to the right by means of the rear wheels only, the rear wheels should be turned or cocked to the left, with the front wheels in the straight-ahead position. This is done by rotating the control lever 15 clockwise about its pivot 16, while turning the steering wheel 23 clockwise to effect clockwise rotation of bell crank 115 and cause leftward movement of the platform 118 with the sprocket wheels 119 and 120 thereon. The rear portion of the chain 132 is moved in a direction to turn the wheel sprockets 117 counterclockwise, as the result of clockwise rotation of sprocket wheel 120 by the described movement of the lever 15, but corresponding counterclockwise movement of the front wheel sprockets is counteracted by the movement of sprocket 120 to the left, tending to move the forward portion of the chain in a direction to turn the front wheel sprockets clockwise.

In FIGURES 19 and 20, there is shown a modification of the structure of FIGURES 13 to 18, employing the sprockets 137 through 142 in the steering operation. A four-throw lever or four-armed spider 145 is rotatably mounted on the platform 118 between the two sprocket wheels 119 and 120, and has two opposed arms 146 and 147 linked to the sprockets 137 and 138, respectively, and the other two opposed arms 148 and 149 linked respectively to the axle pins of sprocket wheels 119 and 120. A turning lever or arm 150 also extends rigidly from the spider 145 and is pivotally connected at its outer end to a connecting rod 151 which extends rearwardly therefrom and is pivoted at its rear end to the lower end of a manual actuating lever 152 suitably pivoted intermediate its ends as at 153 to the vehicle and extending upwardly adjacent the control means 14 for convenient manipulation by the vehicle operator. It will be evident that movement of the actuating lever 152 in either direction about its pivot 153 from a neutral substantially vertical position as indicated in dotted lines in FIGURE 19 will result in rotation of the spider 145 clockwise or counterclockwise as viewed in FIGURE 20. The front and rear sprockets 137 and 138, which in this arrangement serve as take-up sprockets, are mounted for guided movement substantially longitudinally of the vehicle, and have their pivot or axle pins carried by links extending from the spider. Specifically, the front take-up sprocket 137 is connected to a link 154 extending rearwardly and pivoted to the arm 146 of the spider, and the rear take-up sprocket 138 to a link 155 extending forwardly therefrom for pivotal connection to spider arm 147. It will be apparent that when the spider 145 is rotated clockwise from a neutral position indicated in dotted lines in FIGURE 20, the links 154 and 155 are shifted respectively forwardly and rearwardly, to move the take-up sprockets away from each other, and when the spider is rotated counterclockwise as shown in solid lines, the links 154 and 155 are moved to draw the sprockets toward each other.

The sprocket wheels 119 and 120 in this construction are mounted on the plaform 118 in any suitable manner for movement in a direction transverse of the vehicle. In the present instance, the platform is shown as provided with guide means for the sprocket wheels in the form of substantially aligned slots 156 and 157 or the like receiving the sprocket axles or pivots. The shifting link 123 is connected directly to platform 118, as best shown in FIGURES 19 and 21. Links 158 and 159 respectively pivoted to the arms 148 and 149 of the spider 145 rotatably carry the axles or pivot pins 121 and 122 respectively of the sprocket wheels 119 and 120, and upon rotation of the spider from its neutral position effect shifting of the sprocket wheels transversely of the vehicle by moving the pivots 121 and 122 in the slots 156 and 157 or like guide means. It will be apparent that clockwise turning of the spider as viewed in FIGURE 20, which as already explained causes the take-up sprockets 137 and 138 to be moved away from each other, results in the sprockets 119 and 120 being drawn toward each other. Similarly, counterclockwise rotation of the spider, as to the full-line position shown, causes the sprocket wheels 119 and 120 to be moved laterally outwardly and thus away from each other, while the take-up sprockets 137 and 138 are drawn toward each other. The parallelogram linkage arrangement of the bell cranks 127 and 129 accommodates the movements of the sprocket wheel 120.

The remainder of the structure of FIGURES 19 and 20 is substantially the same as that of FIGURES 13 and 14. While the sprocket wheels 119 and 120 are movably mounted on the platform 118, it is to be noted that in its neutral position the spider 145, being held substantially immobile by the actuating lever 152, acts through the links 158 and 159 to hold the sprocket wheel pivots 121 and 122 against movement in the guide slots 156 and 157. Thus the shifting of the platform by operation of the steering wheel 23, and the rotation of sprocket wheel 120 by operation of the control lever 15, as described, may be accomplished substantially as in the apparatus illustrated in FIGURES 13 and 14. It will be evident, also, that the sprockets 137 through 142 may be provided in the construction of FIGURES 13 and 14 to facilitate the addition thereto of the spider 145 and its associated parts as shown in FIGURES 19 and 20 when desired, the sprockets 137 and 138 being remounted for movement by the spider-connected links 154 and 155; or for manufacturing reasons it may be desirable or advantageous to provide the sprockets 137 to 142 inclusive on all vehicles employing the wheel sprockets 117 rotated by the chain 132.

With the spider 145 in its neutral position, the appartus of FIGURES 19 and 20 is operable in the same manner as that of FIGURES 13 and 14 to obtain the various positions of the wheels for the several steering operations illustrated in FIGURES 13 to 18 inclusive. In addition, the apparatus may be operated to position the vehicle wheels for rotary movement of the vehicle about its own central vertical axis, or for directly lateral movement.

Figure 16:
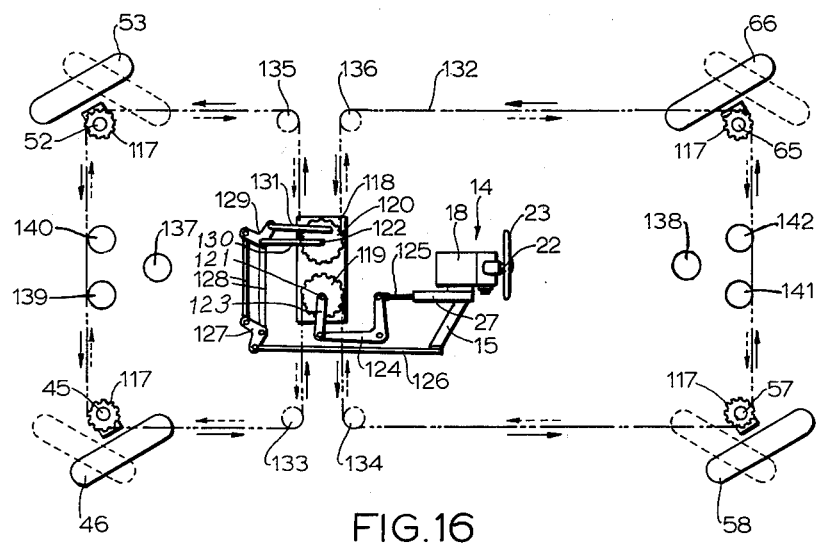
FIGURE 16 is a plan view of the steering apparatus of FIGURE 15, showing in full and broken lines different positions in which the front and rear steering wheels of a vehicle may be disposed for effecting movement of the vehicle in paths transverse to the longitudinal axis of the vehicle.

With the control lever 15 and bell crank 115 in the neutral positions shown in FIGURE 19, the platform 118 in its intermediate or neutral position as shown in FIGURE 20, and the sprocket wheels 119 and 120 positioned substantially midway of the lengths of their guide slots 157 and 156, substantially in the positions relative to the platform shown in FIGURES 14 and 16, the actuating lever 152 is rocked clockwise as viewed in FIGURE 19 from its dotted-line inoperative or neutral position to the full-line position to turn the vehicle wheels from their straight-ahead or dotted-line positions to the full-line positions shown in FIGURE 20. As already explained, this clockwise movement of the lever 152 causes counterclockwise rotation of the spider 145 as viewed in FIGURE 20 from its neutral dotted-line position to its full-line position, drawing the take-up sprockets 137 and 138 inwardly and moving the sprocket wheels 119 and 120 outwardly. At the front of the vehicle, the portions of the chain 132 reeved about front wheel sprockets 117 are drawn laterally inwardly toward the longitudinal axis of the vehicle by the inward or rearward movement of take-up sprocket 137, turning the wheel sprockets in opposite directions. The right front wheel sprocket is turned counterclockwise and the left front wheel sprocket clockwise, to turn the respective wheels correspondingly from the dotted-line to the full-line positions thereof. Similarly, the portions of the chain 132 passed about the rear wheel sprockets are drawn inwardly toward each other by the forward or inward movement of the take-up sprocket 138, to turn the right wheel sprocket and wheel clockwise and the left sprocket and wheel counterclockwise to turn the wheels toward each other into the full-line positions. These positions, it will be obvious, are determined by the intersection of the wheel axes with the central vertical axis 160 of the vehicle, so that the wheels may all follow the same circular path to turn the vehicle about its axis 160.

The wheels may be turned beyond these full-line positions, to positions at substantially 90° to the longitudinal axis of the vehicle, or parallel to the transverse axis of the vehicle, as indicated in dash-dot lines in FIGURE 20, by greater clockwise rotation of actuating lever 152 than is employed for positioning the wheels in the full-line positions for rotary or circular movement of the vehicle, the lever 152 being moved to a position such as indicated in dot-dash lines in FIGURE 19. This results in a greater inward movement of the take-up sprockets 137 and 138 and corresponding movement of the several chain portions engaging the wheel sprockets 117 to turn the wheels substantially 90° from their straight-ahead positions.

To return the vehicle to the straight-ahead or dotted-line positions from either their full-line or dash-dot-line positions, it is only necessary to return the actuating lever 152 to its neutral or inoperative position by counterclockwise rotation. This draws the connecting rod 151 rearwardly to swing the spider 145 clockwise through its turning arm 150, drawing the sprocket wheels 119 and 120 toward each other by means of links 158 and 159, and pushing the take-up sprockets outwardly and apart by means of take-up links 154 and 155, to move the several portions of chain 132 in directions to turn the wheel sprockets 117 and bring the vehicle wheels back to the straight-ahead position. It will be seen that movement of the chain in turning of the wheels from straight-ahead position results from the inward movement of sprockets 137 and 138, while upon return the chain is moved by the inward drawing movement of sprocket wheels 119 and 120. It may be pointed out that in neither operation is there rotation of the sprocket wheels 119 and 120 or of the take-up sprockets 137 and 138.

When the platform 118 is shifted transversely by rotation of the steering wheel 23 to effect turning of the wheels for steering of the vehicle as previously described in connection with FIGURES 15 to 18 inclusive, the spider 145 and its turning arm 150, as well as the linkage associated therewith and the take-up sprockets 137 and 138, are in the neutral position, and the shifting of the platform to the right or left transversely of the vehicle also, of course, moves the spider and the turning arm 150. By reason of the connection of the turning arm 150 to the actuating lever 152 by the rod 151, the pivoted end of the turning arm 150 can move transversely of the vehicle only in an arc about the pivotal connection of the rod 151 to the actuating lever. Accordingly, upon transverse shifting of the platform 118 in turning of the vehicle wheels, the pivoted end of the arm 150 is moved slightly rearwardly as it follows an arc in one direction or the other, and thus causes a slight rotation of the spider 145 to move the take-up links 154 and 155 longitudinally outwardly and the links 158 and 159 laterally inwardly. This results in the chain 132 having a component of movement in one direction or the other by reason of the shifting of the platform, as already described, and also a lesser component of movement due to the link actuation due to the slight rotation of the spider 145 as described resulting from shifting of the platform. This second component is in both, or opposite, directions laterally outwardly from the front take-up sprocket 137, and similarly from the rear take-up sprocket 138, chain being drawn laterally inwardly at both sides by the action of sprocket wheels 119 and 120. The second component is positive relative to the first component or effective in the same direction, at one wheel of each pair being turned by the chain, and negative or opposed in direction at the other wheel, so that the resultant chain movement at the one wheel is greater than at the other. The desired splay is thus achieved, since one wheel of the pair is turned by sprocket 117 about its vertical swivel axis through a greater arc or angle than the other. It will be evident that the front wheels are caused to diverge in the forward direction, and the rear wheels to diverge rearwardly. It will also be evident that the inside wheel on any particular turn of the vehicle is the one which is swiveled through the greater angle, or turn more sharply. The wheel axes intersect substantially at the system steering center. Thus, as with the construction shown in FIGURES 11 and 12, each wheel of a pair of wheels employed in steering the vehicle about a turn is disposed substantially tangentially of its arc of travel about the steering center. The apparatus shown in FIGURES 19 and 20 thus is effective not only for turning the wheels at least as much as 90° from their normal or straight-ahead positions, but for producing the desired relative angularity of splay of the wheels. As with the apparatus of FIGURES 11 and 12, the vehicle may be driven in reverse with the same operation and effect so far as splay is concerned as when it is driven forwardly. While the movement of the chain resulting from the transverse movement of the platform and sprockets as previously explained is in some cases modified as the result of movement of the control lever 15, as clearly described hereinbefore, this does not affect the provision and control of splay.

If desired, the apparatus of FIGURES 19 and 20 may be employed only for its splay-providing function, in which case the actuating lever 152 may be eliminated. Similarly, the apparatus of FIGURES 13 and 14 may be modified for provision of splay, if it includes the sprockets 137 to 142 inclusive, merely by adding the spider 145 and its associated linkage, including the rod 151 but not the lever 152.

The apparatus disclosed in FIGURES 13 to 21 inclusive may, like that of FIGURES 1 to 12 inclusive, be employed with more than two pairs of wheels. It will be obvious that wheels intermediate the front and rear wheels may be arranged to be turned by means of the sprocket chain 132, suitable gearing or linkage being provided to obtain the proportionate angular positioning of the intermediate wheels as in the case of the intermediate wheels employed with the apparatus as disclosed in FIGURES 1 to 12.

It should be noted that by the present invention, turning of a vehicle to the right or left by use of the steering wheel 23 is, in each case, accomplished by turning the steering wheel clockwise for a right turn, and counterclockwise for a left turn, in the same fashion as in conventional automotive vehicles, so that possible confusion in steering by means of the present apparatus is largely, if not completely, eliminated. The vehicle may be moved at right angles to its longitudinal axis by turning of the wheels to positions perpendicular to that axis by either the apparatus of FIGURES 1 to 12 or that of FIGURES 13 to 21, as heretofore pointed out, although the rotation of the vehicle about its vertical axis can be accomplished only by substantially the apparatus of FIGURES 13 to 21, particularly FIGURES 19 and 20.

It will be understood that the invention is not limited to operation of vehicles having an even number of wheels, arranged in pairs, since the apparatus may be employed with any desired number of wheels, whether even or odd. Thus, for example, a three-wheeled vehicle may have the invention applied thereto, as may a five-wheeled vehicle. Similarly, the apparatus need not be provided in the particular arrangement illustrated, since it may, for example, have certain elements or portions in vertical instead of horizontal position for reasons of space or convenience.

Great flexibility in maneuvering a vehicle provided with steering apparatus according to the present invention is achieved by reason of the many different ways in which the vehicle may be steered. The invention, as will be apparent, is of particular value in the case of vehicles employed in restricted spaces or under other conditions allowing only limited movement of the vehicle.

It is to be understood that the invention is not restricted to the embodiments thereof herein disclosed, which are illustrated and described by way of example and not limitation, since it will be apparent that many modifications and variations may be made without departing from the scope of the invention.

We claim:

1. Universal steering apparatus for a vehicle having a plurality of pairs of steerable wheels, comprising a swivel shaft carrying each of the wheels for turning about a vertical axis, manually operable steering control means including a steering wheel, parallelogram linkage mounting said control means for movement longitudinally of the vehicle and including a control lever pivoted at one end to the control means and intermediate its ends to the vehicle, means for conjointly rotating the swivel shafts of each pair of wheels, and means operatively connecting said rotating means to the other end of said control lever and to said steering wheel for selective turning of the pairs of wheels to directional positions in response to selective independent and conjoint movement of the steering wheel and control lever.

2. Universal steering apparatus for a vehicle having a plurality of steerable wheels, comprising a swivel shaft carrying each of the wheels for turning about a vertical axis, manually operable steering control means including a rotatable shaft and a pivoted lever, means mounting said control means for movement longitudinally of the vehicle and including said lever, and means operatively connecting said swivel shafts to said rotatable shaft and the lever for turning of the wheels to selected directional positions in response to selective independent and conjoint rotational movement of the rotatable shaft and pivotal movement of the lever.

3. Universal steering apparatus for a vehicle having a plurality of steerable wheels, comprising means mounting each of the wheels for turning about a vertical axis, manually operable steering control means including two independently movable elements, means operatively interconnecting said control elements at all times for selective operational movement thereof either in conjunction with or independently of each other, and means operatively connecting said wheel mounting means to each of said elements for selective turning of the wheels to directional positions in response to selective independent and conjoint movement of the elements.

4. Universal steering apparatus for a vehicle having a plurality of steerable wheels, comprising means mounting each of the wheels for turning about a vertical axis, manually operable steering control means including at least two control elements movable independently, means common to said control elements for turning the wheels, means operatively connecting said control elements at all times for selective movement thereof alternatively in conjunction with or independently of each other, and means operatively connecting said turning means to each of the control elements for turning of the wheels to selected steering positions in response to selective movement of the control elements.

5. Universal steering apparatus for a vehicle having a plurality of pairs of steerable wheels, comprising a swivel shaft carrying each of the vehicle wheels for turning about a vertical axis, a steering bell crank fixed on the swivel shaft of one wheel of each pair, a steering lever fixed on each of the other swivel shafts, tie rod means connecting each steering bell crank to the steering lever of the other wheel of the pair, manually operable steering control means including a steering wheel, parallelogram linkage mounting said control means for movement longitudinally of the vehicle and including a control lever pivoted at one end to the control means and intermediate its ends to the vehicle, a control bell crank pivotally mounted on the other end of said control lever for bodily movement thereby longitudinally in both directions, means connecting said control bell crank to said steering wheel for rotation thereby in both directions, and a plurality of drag links each pivotally connected at one end to the control bell crank for movement thereby and at the other end to one of said steering bell cranks, whereby to effect selective turning of the pairs of wheels in response to selective independent and conjoint movement of the steering wheel and control lever.

6. Universal steering apparatus for a vehicle having a plurality of steerable wheels, comprising a swivel shaft carrying each of the vehicle wheels for turning about a vertical axis, a steering member fixed on the swivel shaft of each wheel movable to turn the swivel shaft, manually operable steernig control means including a rotatable shaft and a pivoted lever, parallelogram linkage mounting said control means for movement longitudinally of the vehicle and including said lever, a control bell crank pivotally mounted on said lever for movement bodily thereby, means connecting said control bell crank to said rotatable shaft for rotation thereby in both directions, a plurality of linkages pivotally connected at one end to the control bell crank for movement thereby and at the other end to said steering members for turning of the wheels to directional steering positions in response to selective independent and conjoint movement of the rotatable shaft and pivoted lever.

7. Universal steering apparatus for a vehicle having a plurality of steerable wheels, comprising means mounting each of the vehicle wheels for turning about a vertical axis, manually operable steering control means including two independently movable control members, a control bell crank pivotally mounted on one of said control members for movement bodily thereby, means connecting said control bell crank to the other of said control members for rotation thereby in both directions, and linkage means connecting the control bell crank to each of said wheel mounting means for turning the wheels to selected steered positions in response to selective independent and conjoint movement of the control members.

8. Universal steering apparatus for a vehicle having a plurality of steerable wheels, comprising means mounting each of the vehicle wheels for turning about a vertical axis, manually operable steering control means including two independently movable control members, means operatively interconnecting said control members at all times for selective operational movement thereof alternatively in conjunction with or independently of each other, and linkage means connecting each of said control members to said wheel mounting means for turning of the wheels to selected steered positions in response to selective independent and conjoint operation of the control members.

9. Universal steering apparatus for a vehicle having a plurality of pairs of steerable wheels, comprising a swivel shaft carrying each of the vehicle wheels for turning about a vertical axis, a steering bell crank fixed on the swivel shaft of one wheel of each pair, a steering lever fixed on each of the other swivel shafts, tie rod means connecting each steering bell crank to the steering lever of the other wheel of the pair, manually operable steering control means including a steering wheel, parallelogram linkage mounting said control means for movement longitudinally of the vehicle and including a control lever pivoted at one end to the control means and intermediate its ends to the vehicle, a control bell crank pivotally mounted on the other end of said control lever for bodily movement thereby longitudinally in both directions, means connecting said control bell crank to said steering wheel for rotation thereby in both directions, a plurality of first drag links each pivotally connected at one end to the control bell crank for movement thereby and at the other end to one of said steering bell cranks to effect selective turning of the pairs of wheels in response to selective independent and conjoint movement of the steering wheel and control lever, a second control bell crank pivotally mounted on the intermediate pivot axis of the control lever, means linking said second bell crank with the first control bell crank for rotation therewith, longitudinally extending second drag links pivotally connected to the second bell crank for movement with said first drag links and each extending longitudinal outwardly beyond the tie rod means of one pair of wheels, and a pivot block for each of said second drag links pivotally connected to the longitudinally outer end thereof and extending inwardly to the adjacent tie rod means, the tie rod means comprising a pair of tie rod halves extending in aligned relation in neutral position of the wheels and pivotally connected at their inner ends to each other and to the associated pivot block.

10. Universal steering apparatus for a vehicle having a plurality of steerable wheels, comprising a swivel shaft carrying each of the vehicle wheels for turning about a vertical axis, a steering member fixed on the swivel shaft of each wheel, tie rod means extending transversely of the vehicle connecting steering member to another steering member, manually operable steering control means including a rotatable shaft and a pivoted lever, parallelogram linkage mounting said control means for movement longitudinally of the vehicle and including said lever, a first control bell crank pivotally mounted on the other end of said lever for bodily movement thereby longitudinally in both directions, means connecting said first bell crank to said rotatable shaft for rotation thereby in both directions, a plurality of linkages pivotally connected to the first bell crank for movement thereby and to said steering members to effect selective turning of the wheels in response to selective independent and conjoint movement of the rotatable shaft and pivoted lever, a second control bell crank pivotally mounted on the intermediate pivot axis of the lever, means linking said second bell crank with the first control bell crank for rotation therewith, longitudinally extending front and rear drag links pivotally connected at their inner ends to the second bell crank for movement with said linkages, and a pivot link for each of said front and rear drag links pivotally connected to the longitudinally outer end thereof and extending inwardly to adjacent tie rod means, the tie rod means comprising a pair of tie rod portions extending in aligned relation in neutral position of the wheels and pivotally connected at their inner ends to each other and to the associated pivot link.

11. Universal steering apparatus for a vehicle having a plurality of steerable wheels, comprising means mounting each of the vehicle wheels for turning about a vertical axis, manually operable steering control means including two independently operable control members, linkage means connecting each of said control members to said wheel mounting means for rotation thereby in both directions and including tie rod means extending transversely of the vehicle connecting the mounting means of two of said wheels for turning both wheels together, each of the tie rod means comprising a pair of rods extending in aligned relation in neutral position of the wheels pivotally connected to each other at their inner ends, whereby to effect selective turning of the wheels in response to selective independent and conjoint movement of the control members, a third control member movably mounted on one of said two control members, means connecting said third control member with the remaining control member for movement therewith, means connected to the third control member for movement with said linkage means and extending longitudinally outward of each tie rod means, and a pivot link pivotally connected to each longitudinally extending means at the outer end thereof and extending inwardly to and pivotally connected to the pivotal connection of the rods of the adjacent tie rod means.

12. Universal steering apparatus for a vehicle having a plurality of pairs of steerable wheels, comprising a swivel shaft carrying each of the wheels for turning about a vertical axis, a steering sprocket fixed on each swivel shaft, a platform slidably mounted on the vehicle, a pair of sprocket wheels rotatably mounted on said platform, an endless sprocket chain trained about the steering sprockets and having opposed runs thereof also trained one about each of the sprocket wheels on the platform, steering control means including a steering wheel, parallelogram linkage mounting said control means for movement longitudinally of the vehicle and including a control lever pivoted at one end to the control means and pivoted intermediate its ends to the vehicle, a pair of bell cranks, a link pivotally connected to the other end of said control lever and to one arm of one of said bell cranks, an arm pivoted on the pivot axis of the other bell crank and on the axis of one of said sprocket wheels, a turning link generally paralleling said pivoted arm and pivoted at one end to one arm of said other bell crank and at the other end to said one sprocket wheel in eccentric relation, a pair of links one connecting the other arms and the other connecting the pivot axes of the bell cranks to define a parallelogram linkage, whereby pivotal movement of the control lever effects rotation of the one sprocket wheel, a control bell crank pivoted on the vehicle co-axially with said intermediate pivot of the control lever, means connecting the control bell crank with the steering wheel for rotation thereby, a steering bell crank lever pivoted on the vehicle with one arm extending adjacent the slidable platform, a shifting link connecting said one steering bell crank lever arm to the platform, and a link connecting the other arm of the steering bell crank lever to said control bell crank, whereby rotation of the steering wheel effects sliding movement of said platform.

13. Universal steering apparatus for a vehicle having a plurality of steerable wheels, comprising means mounting each of the wheels for turning about a vertical axis, a platform mounted on the vehicle for movement transversely thereof, a pair of sprocket wheels mounted on said platform for rotation relative thereto, an endless sprocket chain engaged with said wheel mounting means and having opposed runs thereof trained one about each of the sprocket wheels on the platform, steering control means including a rotatable shaft and a pivoted lever, parallelogram linkage including said pivoted lever mounting said control means for movement longitudinally of the vehicle, linkage connecting the lever to one of the sprocket wheels for rotation thereof upon pivotal movement of the lever, and linkage means connecting the platform to said rotatable shaft for movement thereby upon rotation thereof, whereby to effect rotation of the wheels to selected steering positions by selective independent and conjoint rotational movement of the rotatable shaft and pivotal movement of the lever.

14. Universal steering apparatus for a vehicle having a plurality of steerable wheels, comprising means mounting each of the wheels for turning about a vertical axis, a platform mounted for substantially rectilinear movement on the vehicle, a pair of circular members movable with said platform and rotatable relative thereto, an endless flexible member engaged with said wheel mounting means and trained about each of said circular members, steering control means including two independently movable control members, means for interengaging said control members for cooperable movement, linkage connecting the platform to one of said control members for movement thereby, linkage means connecting one of the circular members to the other control member for rotation thereby, said endless flexible member being moved by operation of the circular members to turn the wheels to selected positions in response to selective independent and conjoint movement of the control members.

15. Universal steering apparatus for a vehicle having a plurality of steerable wheels, comprising means mounting each of the wheels for turning about a vertical axis, a platform movable substantially rectilinearly on the vehicle, a pair of circular members rotatable relative to and movable with said platform, an endless flexible member engaged with said wheel mounting means and trained about each of said circular members, two independently movable control members, means interengaging said control members for cooperative movement, means for moving the platform operatively connected to one of said control members, and means for effecting limited rotation of one of said circular members operatively connected to the other control member, whereby turning of the wheels to selected positions by movements of the endless member in response to movements of the circular member is effected by selective independent and co-operational movements of the two control members.

16. Universal steering apparatus for a vehicle having a plurality of steerable wheels, comprising means mounting each of said wheels for turning about a vertical axis, a pair of rotatable driving members movable substantially rectilinearly on the vehicle in spacedly fixed relation to each other, means for moving said driving members in said relation, a first movable control member operatively connected to said moving means, means for effecting limited rotation of at least one of said driving members, a second movable control member operatively connected to said rotation means and movable independently of said first control member, means interengaging the first and second control members for cooperable movement, and endless means operatively engaged with the driving members and said wheel mounting means movable by the driving members to effect turning of the wheels to selected positions in response to selective movements of said control members.

17. Universal steering apparatus for a vehicle having a plurality of pairs of steerable wheels, comprising a swivel shaft carrying each of the wheels for turning about a vertical axis, a steering sprocket fixed on each swivel shaft, a platform mounted on the vehicle for movement transversely thereof, a pair of sprocket wheels rotatably mounted on said platform, an endless sprocket chain trained about the steering sprockets and having opposed runs thereof also trained one about each of the sprocket wheels on the platform, steering control means including a steering wheel, parallelogram linkage mounting said control means for movement longitudinally of the vehicle and including a control lever pivoted at one end to the control means and pivoted intermediate its ends to the vehicle, a pair of bell cranks, a first link pivotally connected to the other end of said control lever and to one arm of one of said bell cranks, an arm pivoted on the pivot axis of the other bell crank and on the axis of one of said sprocket wheels, a turning link generally paralleling said pivoted arm and pivoted at one end to one arm of the other bell crank and at the other end to said one sprocket wheel in eccentric relation, a pair of links one connecting the other arms and the other connecting the pivot points of the bell cranks to define a parallelogram linkage, whereby pivotal movement of the control lever effects rotation of the one sprocket wheel, a control bell crank pivoted on the vehicle co-axially with said intermediate pivot of the control lever, means connecting the control bell crank with the steering wheel for rotation thereby, a steering bell crank lever pivoted on the vehicle with one arm extending generally longitudinally adjacent the platform, a shifting link connecting said one bell crank lever arm to the platform, and a link connecting the other arm of the bell crank lever to said control bell crank, whereby rotation of the steering wheel effects transverse movement of said platform, means allowing substantially aligned movement of the sprocket wheels relative to the platform transversely of the vehicle, a four-armed spider rotatably mounted on the platform intermediate the sprocket wheels, a radially extending turning arm fixed on the spider, a spider actuating lever pivoted on the vehicle, a connecting rod pivotally connected to said actuating lever and said spider turning arm for rotation of the spider to operative position upon movement of the actuating lever in one direction, a pair of links each pivotally connected to the pivot pin of one of the sprocket wheels and to one of the arms of the spider for movement of the sprocket wheels away from and toward each other upon movement of the spider toward and from its operative position, the spider in inoperative position holding the sprocket wheels in spacedly fixed relation, a pair of take-up sprockets spaced one forwardly and the other rearwardly from the spider and having said chain trained thereabout, and a pair of take-up links each pivoted at one end to one of the other arms of the spider and rotatably mounting one of said take-up sprockets at the other end for movement of the take-up sprockets toward and away from each other upon movement of the spider toward and from its operative position, whereby the chain is paid out and taken up by the sprocket wheels as it is respectively taken up and paid out by the take-up sprockets.

18. Universal steering apparatus for a vehicle having a plurality of steerable wheels, comprising means mounting each of the wheels for turning about a vertical axis, a platform mounted on the vehicle for movement transversely thereof, a pair of sprocket wheels rotatably mounted on said platform, an endless sprocket chain engaged with said wheel mounting means and trained about each of the sprocket wheels on the platforms, steering control means including a rotatable shaft and a pivoted lever, linkage connecting the lever to one of the sprocket wheels for limited rotation thereof upon pivotal movement of the lever, linkage means operatively connecting said rotatable shaft to the platform for transverse movement thereof upon rotation of the shaft, means allowing substantially aligned movement of the sprocket wheels toward and from each other including a four-armed spider rotatably mounted on the platform intermediate the sprocket wheels, a radially extending turning arm fixed on the spider, a spider actuating lever pivoted on the vehicle, a connecting rod pivotally connected to said actuating lever and said spider turning arm for rotation of the spider to operative position upon movement of the actuating lever in one direction, a pair of links each pivotally connected to the pivot pin of one of the sprocket wheels and to one of the arms of the spider for movement of the sprocket wheels away from and toward each other upon movement of the spider toward and from its operative position, a pair of take-up sprockets spaced one forwardly and the other rearwardly from the spider and having said chain trained thereabout, a pair of take-up links each pivoted at one end to one of the other arms of the spider and at the other end rotatably mounting one of said take-up sprockets for movement of the sprockets toward and away from each other upon movement of the spider toward and from its operative position, whereby the chain is paid out and taken up by the sprocket wheels as it is respectively taken up and paid out by the take-up sprockets.

19. Universal steering apparatus for a vehicle having a plurality of steerable wheels, comprising means mounting each of the wheels for turning about a vertical axis, a platform movable substantially rectilinearly on the vehicle, a pair of circular members rotatable relative to and movable with said platform, an endless flexible member engaged with said wheel mounting means and trained about each of said circular members, two independently movable control members, means for moving the platform operatively connected to one of said control members, means for effecting rotation of at least one of the circular members operatively connected to the other control member, whereby turning of the wheels to selected positions by movements of said endless member in response to movements of the circular members is effected by selective independent and co-operational movements of the two control members, means allowing substantially aligned movement of the circular members toward and from each other, rotatable means mounted on the platform intermediate the circular members movable to shift the circular members toward and from each other and movable to inoperative position to hold the circular members in fixedly spaced relation to each other, manual actuating means for moving said rotatable means, a pair of rotatable take-up members intermediate the circular members along the endless member and engaged with the endless member, and means connecting said take-up members with said rotatable means for movement toward and from each other by movement thereof, whereby the endless member is paid out and taken up by the circular members as it is respectively taken up and paid out by the take-up members.

20. Universal steering apparatus for a vehicle having a plurality of wheels, comprising means mounting each of said wheels for turning about a vertical axis, a pair of rotatable driving members movable substantially rectilinearly on the vehicle in spaced fixed relation to each other, means for moving said driving members in said relation, first movable control means operatively connected to said moving means, means for effecting limited rotation of at least one of the driving members, second movable control means operatively connected to said rotation means, endless means operatively engaged with the driving members to be moved thereby and also engaged with said wheel mounting means to effect turning of the wheels to selected positions in response to selective movements of said first and second control means, means allowing movement of the driving members toward and from each other, rotatable means intermediate the driving members movable toward and from a holding position to shift the driving members from and toward each other and in said position to hold the driving members in said spacedly fixed relation to each other, manual actuating means for moving said rotatable means, and a pair of rotatable take-up members engaged with the endless member and disposed along opposed portions thereof each intermediate the driving members and connected to the rotatable means for movement toward and from each other by rotatable means movement toward and from its holding positoin, whereby the endless member is taken upon and paid out by the driving members as it is respectively paid out and taken up by the take-up members.

21. Universal steering apparatus for a vehicle having a plurality of pairs of wheels, comprising means mounting each of said wheels for turning about a vertical axis, a pair of rotatable driving members movable substantially rectilinearly on the vehicle in spacedly fixed relation to each other, means for moving said driving members in said relation, first movable control means operatively connected to said moving means, means for effecting limited rotation of at least one of the driving members, second movable control means operatively connected to said rotation means, endless means operatively engaged with the driving members to be moved thereby and also engaged with said wheel mounting means to effect turning of the wheels to selected positions in response to selective movements of said first and second control means, means allowing movement of the driving members toward and from each other, rotatable means mounted on the vehicle intermediate the driving members movable therewith in said rectilinear movement and rotatable toward and from a holding position to shift the driving members from and toward each other and in said position to hold the driving members in said spaced fixed relation to each other, manual actuating means for rotating said rotatable means, a connecting rod pivoted to the rotatable means eccentrically of the axis thereof and pivotally connected to said actuating means, and a pair of rotatable take-up members engaged with the endless member and disposed along opposed portions thereof each intermediate the driving members and connected to the rotatable means for movement toward and from each other by rotatable means movement toward and from holding position, the pivotal connection of said connecting rod to the rotatable means swinging in an arc about the pivotal connection of the connecting rod to the actuating means upon said rectilinear movement of the driving members and causing rotation of the rotatable means to shift the take-up members away from each other to effect slight angular divergence of the wheels of each pair relative to each other in turning of the vehicle.

22. Universal steering apparatus for a vehicle having a plurality of pairs of wheels, comprising means mounting each of said wheels for turning about a vertical axis, a pair of rotatable driving members movable substantially rectilinearly on the vehicle in spacedly fixed relation to each other, means for moving said driving members in said relation, first movable control means operatively connected to said moving means, means for effecting limited rotation of at least one of the driving members, second movable control means operatively connected to said rotation means, endless means operatively engaged with the driving members to be moved thereby and also engaged with said wheel mounting means to effect turning of the wheels to selected positions in response to selective movements of said first and second control means, means allowing movement of the driving members toward and from each other, rotatable means mounted on the vehicle intermediate the driving members movable therewith in said rectilinear movement and rotatable toward and from a holding position to shift the driving members from and toward each other and in said position to hold the driving members in said spacedly fixed relation to each other, a rod pivoted at one end to the rotatable means eccentrically of the axis thereof and pivotally mounted on the vehicle to swing with said movement of the driving members, and a pair of rotatable take-up members engaged with the endless member and disposed along opposed portions thereof each intermediate the driving members and connected to the rotatable means for movement toward and from each other by rotatable means movement toward and from holding position, the pivotal connection of said rod to the rotatable means swinging in an arc about the pivotal connection of the rod to the vehicle upon said rectilinear movement of the driving members and causing rotation of the rotatable means to shift the take-up members away from each other to effect slight angular divergence of the wheels of each pair relative to each other in turning of the vehicle.

23. Universal steering apparatus for a vehicle having front and rear pairs of wheels and at least one pair of wheels intermediate the front and rear pairs, means mounting each wheel for turning about a vertical axis, means connecting the wheels of each pair for corresponding turning movement, steering control means including a rotatable shaft and a lever pivoted intermediate its ends, a triple-throw lever pivoted on an end of said pivoted lever, means connecting said triple-throw lever for rotation by said rotatable shaft, and drag links connecting each pair of wheels to the triple-throw lever for turning thereby upon movement thereof, the drag links from said front and rear pairs of wheels being pivotally connected to the triple-throw lever in spaced relation to each other with the pivotal axis of the triple-throw lever located therebetween, and the drag link from each intermediate wheel pair being pivotally connected to the triple-throw lever at a point spaced between the pivotal connections of the front and rear drag links in proportion to the spacing of the respective intermediate wheel pair between the front and rear pairs of wheels.

24. Universal steering apparatus for a vehicle having front, rear, and intermediate wheels, comprising means mounting each wheel for swiveling about a vertical axis, steering control means mounted on the vehicle including two independently movable elements, means for intertengaging said elements at all times for selective cooperable movement either in conjunction with or independently of each other, and means connecting the control elements to the respective wheels for effecting selective swiveling of the wheels to selected positions in response to independent and cooperable movements of the elements, the connections of the respective connecting means to the elements being in spaced relation proportionate to the spacing of the front, intermediate, and rear wheels to effect turning of the intermediate wheels to swiveled positions turned relative to the corresponding swiveled positions of the front and rear wheels in proportion to said wheel spacing.

References Cited by the Examiner
UNITED STATES PATENTS

| | | | |
|---|---|---|---|
| 638,331 | 12/99 | Grant | 280—96 X |
| 1,331,801 | 2/20 | Buttner | 74—494 |
| 1,368,959 | 2/21 | Moller | 280—96 X |
| 1,901,276 | 3/33 | Adams. | |
| 2,232,015 | 2/41 | Skok | 280—91 |
| 2,834,605 | 5/58 | McCollough | 280—91 |
| 3,075,784 | 1/63 | Beyerstedt | 280—91 |
| 3,077,354 | 2/63 | Rateau | 280—99 |

FOREIGN PATENTS

| | | |
|---|---|---|
| 694,456 | 8/40 | Germany. |
| 789,745 | 11/35 | France. |

A. HARRY LEVY, *Primary Examiner.*